(12) United States Patent
Kim et al.

(10) Patent No.: US 11,507,106 B2
(45) Date of Patent: *Nov. 22, 2022

(54) PATH PROVIDING DEVICE AND PATH PROVIDING METHOD THEREOF

(71) Applicant: LG Electronics Inc., Seoul (KR)

(72) Inventors: Sungmin Kim, Seoul (KR);
Seunghwan Bang, Seoul (KR)

(73) Assignee: LG Electronics Inc., Seoul (KR)

( * ) Notice: Subject to any disclaimer, the term of this patent is extended or adjusted under 35 U.S.C. 154(b) by 79 days.

This patent is subject to a terminal disclaimer.

(21) Appl. No.: 17/035,325

(22) Filed: Sep. 28, 2020

(65) Prior Publication Data

US 2021/0064053 A1 Mar. 4, 2021

Related U.S. Application Data

(63) Continuation of application No. PCT/KR2019/011418, filed on Sep. 4, 2019.

(51) Int. Cl.
| | |
|---|---|
| *G05D 1/02* | (2020.01) |
| *G07C 5/02* | (2006.01) |
| *G07C 5/00* | (2006.01) |
| *G06K 9/00* | (2022.01) |
| *H04L 29/06* | (2006.01) |

(Continued)

(52) U.S. Cl.
CPC ......... *G05D 1/0246* (2013.01); *G05D 1/0214* (2013.01); *G05D 1/0276* (2013.01); *G06F 21/602* (2013.01); *G06V 20/588* (2022.01); *G07C 5/008* (2013.01); *G07C 5/02* (2013.01);

(Continued)

(58) Field of Classification Search
None
See application file for complete search history.

(56) References Cited

U.S. PATENT DOCUMENTS

| | | | |
|---|---|---|---|
| 2017/0122749 A1* | 5/2017 | Urano | G01C 21/20 |
| 2018/0089538 A1* | 3/2018 | Graham | G01S 13/865 |

(Continued)

FOREIGN PATENT DOCUMENTS

| | | |
|---|---|---|
| JP | 2007271384 | 10/2007 |
| KR | 1020150058679 | 5/2015 |

(Continued)

*Primary Examiner* — Anne Marie Antonucci
*Assistant Examiner* — Kyle S Park
(74) *Attorney, Agent, or Firm* — Fish & Richardson P.C.

(57) ABSTRACT

A path providing device configured to provide a path information to a vehicle includes: a communication unit configured to receive, from a server, map information including a plurality of layers of data, an interface unit configured to receive sensing information from one or more sensors disposed at the vehicle, a processor, and an event data recorder (EDR) configured to store vehicle status information including first sensor data sensed by a first sensor associated with an operation of the vehicle, and second sensor data sensed by a second sensor associated with surrounding information of the vehicle. The processor is configured to determine an optimal path for guiding the vehicle from an identified lane, generate autonomous driving visibility information, update the optimal path based on dynamic information and the autonomous driving visibility information, and include the vehicle status information stored in the EDR in the autonomous driving visibility information.

16 Claims, 26 Drawing Sheets

(51) Int. Cl.
*G06F 21/60* (2013.01)
*H04L 9/40* (2022.01)
*G06V 20/56* (2022.01)

(52) U.S. Cl.
CPC . *H04L 63/0428* (2013.01); *G05D 2201/0213* (2013.01)

(56) References Cited

U.S. PATENT DOCUMENTS

| | | | | |
|---|---|---|---|---|
| 2018/0164811 | A1* | 6/2018 | Yoo | B60W 30/12 |
| 2018/0209801 | A1* | 7/2018 | Stentz | G01C 21/3415 |
| 2019/0140850 | A1* | 5/2019 | Ambrosin | H04L 9/0894 |
| 2019/0244517 | A1* | 8/2019 | Moustafa | G08G 1/0141 |
| 2020/0175788 | A1* | 6/2020 | Park | G07C 5/085 |
| 2021/0341940 | A1* | 11/2021 | Baik | G05D 1/0274 |

FOREIGN PATENT DOCUMENTS

| | | |
|---|---|---|
| KR | 1020180068490 | 6/2018 |
| KR | 1020180091357 | 8/2018 |
| WO | WO2018015811 | 1/2018 |

* cited by examiner

[ V2X-LDM ]

[ eHorizon-ADASIS ]

PATH PROVIDING DEVICE AND PATH PROVIDING METHOD THEREOF

CROSS-REFERENCE TO RELATED APPLICATION

This application is a continuation of International Application No. PCT/KR2019/011418, filed on Sep. 4, 2019, the disclosure of which is incorporated by reference in its entirety.

TECHNICAL FIELD

The present disclosure relates to a path providing device providing a path (route) to a vehicle and a path providing method thereof.

BACKGROUND

A vehicle refers to means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

For the convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

As the development of the advanced driver assistance system (ADAS) is actively undergoing in recent time, development of a technology for optimizing user's convenience and safety while driving a vehicle is required.

As part of this effort, in order to effectively transmit electronic Horizon (eHorizon) data to autonomous driving systems and infotainment systems, the European Union Original Equipment Manufacturing (EU OEM) Association has established a data specification and transmission method as a standard under the name "Advanced Driver Assistance Systems Interface Specification (ADASIS)."

In addition, eHorizon (software) is becoming an integral part of safety/ECO/convenience of autonomous vehicles in a connected environment.

SUMMARY

The present disclosure describes a path providing device configured to provide autonomous driving visibility information allowing autonomous driving, and a path providing method thereof.

The present disclosure also describes a path providing device capable of fusing autonomous driving visibility information with status information, and a path providing method thereof.

The present disclosure further describes a new path providing device including an Event Data Recorder (EDR) for recognizing vehicle status information, and a path providing method thereof.

The present disclosure further describes a path providing device configured to determine a fault (mistake) of an accident using vehicle status information and autonomous driving visibility information, and a path providing method thereof.

According to one aspect of the subject matter described in this application a path providing device configured to provide a path information to a vehicle includes a communication unit configured to receive, from a server, map information including a plurality of layers of data, an interface unit configured to receive sensing information from one or more sensors disposed at the vehicle, the sensing information including an image received from an image sensor, and a processor. The processor may be configured to identify a lane in which the vehicle is located among a plurality of lanes of a road based on the sensing information, determine an optimal path for guiding the vehicle from the identified lane, the optimal path comprising one or more lanes included in the map information, generate autonomous driving visibility information and transmit the generated autonomous driving visibility information to at least one of the server or an electric component disposed at the vehicle based on the sensing information and the determined optimal path, and update the optimal path based on dynamic information related to a movable object located on the optimal path and the autonomous driving visibility information. The path providing device may further include an event data recorder (EDR) configured to store vehicle status information including first sensor data sensed by a first sensor associated with an operation of the vehicle, and second sensor data sensed by a second sensor associated with surrounding information of the vehicle. The processor may be configured to include the vehicle status information stored in the EDR in the autonomous driving visibility information.

Implementations according to this aspect may include one or more of the following features. For example, the processor may be configured to process the stored vehicle status information into a form of layer and fuse the processed vehicle status information with the autonomous driving visibility information.

In some implementations, the processor may be configured to fuse the stored vehicle status information with the autonomous driving visibility information based on a location of the vehicle and time. In some examples, the processor may be configured to, based on a sensor among the one or more sensors sensing an occurrence of a specific event, extract vehicle status information associated with the specific event from the stored vehicle status information, in which a time point associated with the occurrence of the specific event is included and is generated for a predetermined time based on the time point, and fuse the extracted vehicle status information with the autonomous driving visibility information.

In some examples, the processor may be configured to transmit the autonomous driving visibility information fused with the vehicle status information to the server through the communication unit. In some examples, the processor may be configured to transmit, to the server, a portion of the autonomous driving visibility information in a tile unit, fused with the vehicle status information.

In some implementations, the processor may be configured to transmit, based on the vehicle status information being fused with a plurality of the portions of the autonomous driving visibility information, the plurality of the portions of the autonomous driving visibility information fused with the vehicle status information, to the server. In some examples, In some implementations, the processor may be configured to delete, based on the vehicle transmitted the autonomous driving visibility information fused with the vehicle status information to the server or the vehicle being out of an area where the specific event has occurred by a predetermined distance or more, the vehicle status information fused with the autonomous driving visibility information. In some examples the specific event may include at least one of a collision of the vehicle, a theft of the vehicle, or a collision of another vehicle occurred within a predetermined distance from the vehicle.

In some implementations, the processor may be configured to store the vehicle status information in the EDR by associating the vehicle status information with the optimal path. In some implementations, the EDR may be configured to determine vehicle status information for a predetermined time before a time point associated with an occurrence of a specific event, based on the first sensor data and the second sensor data.

In some examples, the EDR may be configured to receive, from the processor, information obtained by processing the first sensor data and the second sensor data, and determine a driving state of the vehicle based on the received information. In some implementations, the EDR may be configured to encrypt the first sensor data and the second sensor data, and transmit the encrypted data to the server through the communication unit.

In some implementations, the EDR may be configured to encrypt vehicle status information determined by using the first sensor data and the second sensor data, and transmit the encrypted vehicle status information to the processor. In some examples, the processor may be configured to decrypt the encrypted information, and determine whether there is a fault for a specific event based on the encrypted information being received from the EDR.

In some examples, the processor may be configured to transmit information related to the fault determination to the server through the communication unit.

According to another aspect of the subject matter described in this application, a path providing method, performed by a path providing device configured to provide path information to a vehicle, may include receiving, from a server, map information including a plurality of layers of data, receiving, from one or more sensors disposed at the vehicle, sensing information including an image received from an image sensor, identifying a lane in which the vehicle is located among a plurality of lanes of a road based on the sensing information, determining an optimal path for guiding the vehicle from the identified lane, the optimal path comprising one or more lanes included in the map information, generating autonomous driving visibility information and transmitting the generated autonomous driving visibility information to at least one of the server or an electric component disposed at the vehicle based on the sensing information and the determined optimal path, updating the optimal path based on dynamic information related to a movable object located in the optimal path and the autonomous driving visibility information, storing vehicle status information including first sensor data sensed by a first sensor associated with an operation of the vehicle, and second sensor data sensed by a second sensor associated with surrounding information of the vehicle, and including the stored vehicle status information in the autonomous driving visibility information.

Implementations according to this aspect may include one or more following features. For example, the method may further include processing the stored vehicle status information into a form of layer, and fusing the processed vehicle status information with the autonomous driving visibility information.

In some implementations, the method may further include fusing the stored vehicle status information with the autonomous driving visibility information based on a location of the vehicle and time. In some examples, the method may further include based on sensing an occurrence of a specific event, extracting vehicle status information associated with the specific event from the stored vehicle status information, in which a time point associated with the occurrence of the specific event is included and is generated for a predetermined time based on the time point, and fusing the extracted vehicle status information with the autonomous driving visibility information.

The effects of a path providing device and a path providing method thereof according to the present disclosure will be described.

First, the present disclosure may provide a path providing device that is optimized for generating or updating autonomous driving visibility information.

Second, the present disclosure may provide a new path providing device capable of linking (associating) vehicle status information with autonomous driving visibility information by including an event data recorder (EDR).

Third, the present disclosure can provide a path providing device, capable of determining presence or non-presence of fault for an accident, based on vehicle status information determined in an EDR and autonomous driving visibility information generated in the path providing device, and a method of controlling the same.

DETAILED DESCRIPTION

Figure 1:
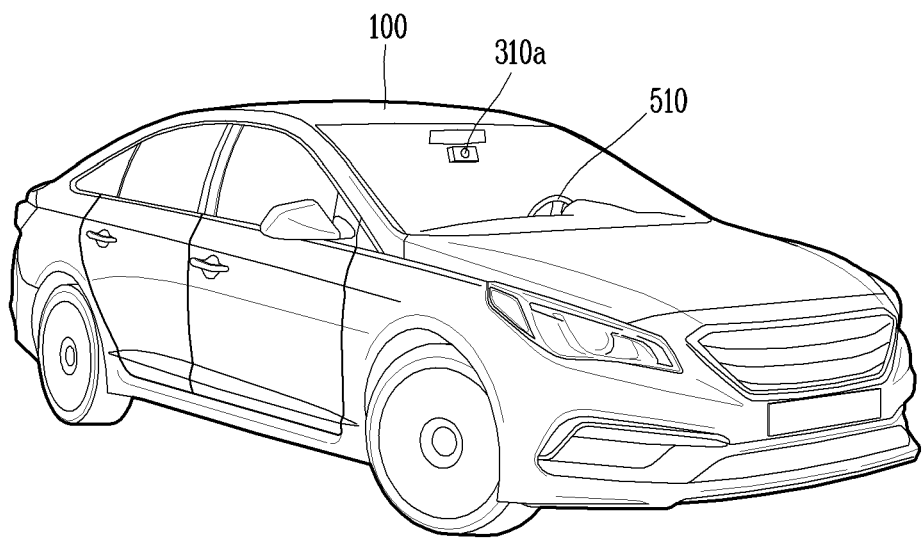
FIG. 1 illustrates an outer appearance of a vehicle.
Figure 1:
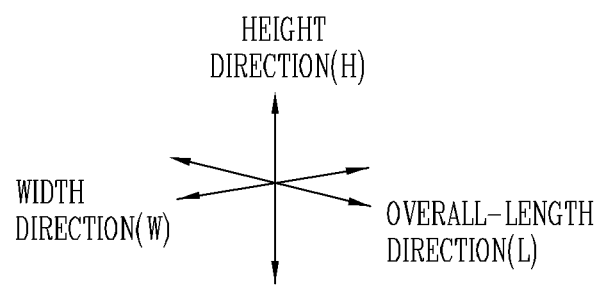

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to some implementations of the present disclosure may be understood as a conception including cars, motorcycles and the like. Hereinafter, the vehicle will be described based on a car.

The vehicle according to some implementations of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle or the like refers to a left side in a driving direction of the vehicle, and a right side of the vehicle or the like refers to a right side in the driving direction.

As illustrated in FIGS. 1 to 7, a vehicle 100 may include wheels turning by a driving force, and a steering input device 510 for adjusting a driving (proceeding, moving) direction of the vehicle 100.

The vehicle 100 may be an autonomous vehicle.

In some implementations, the vehicle 100 may be switched into an autonomous mode or a manual mode based on a user input.

Figure 7:
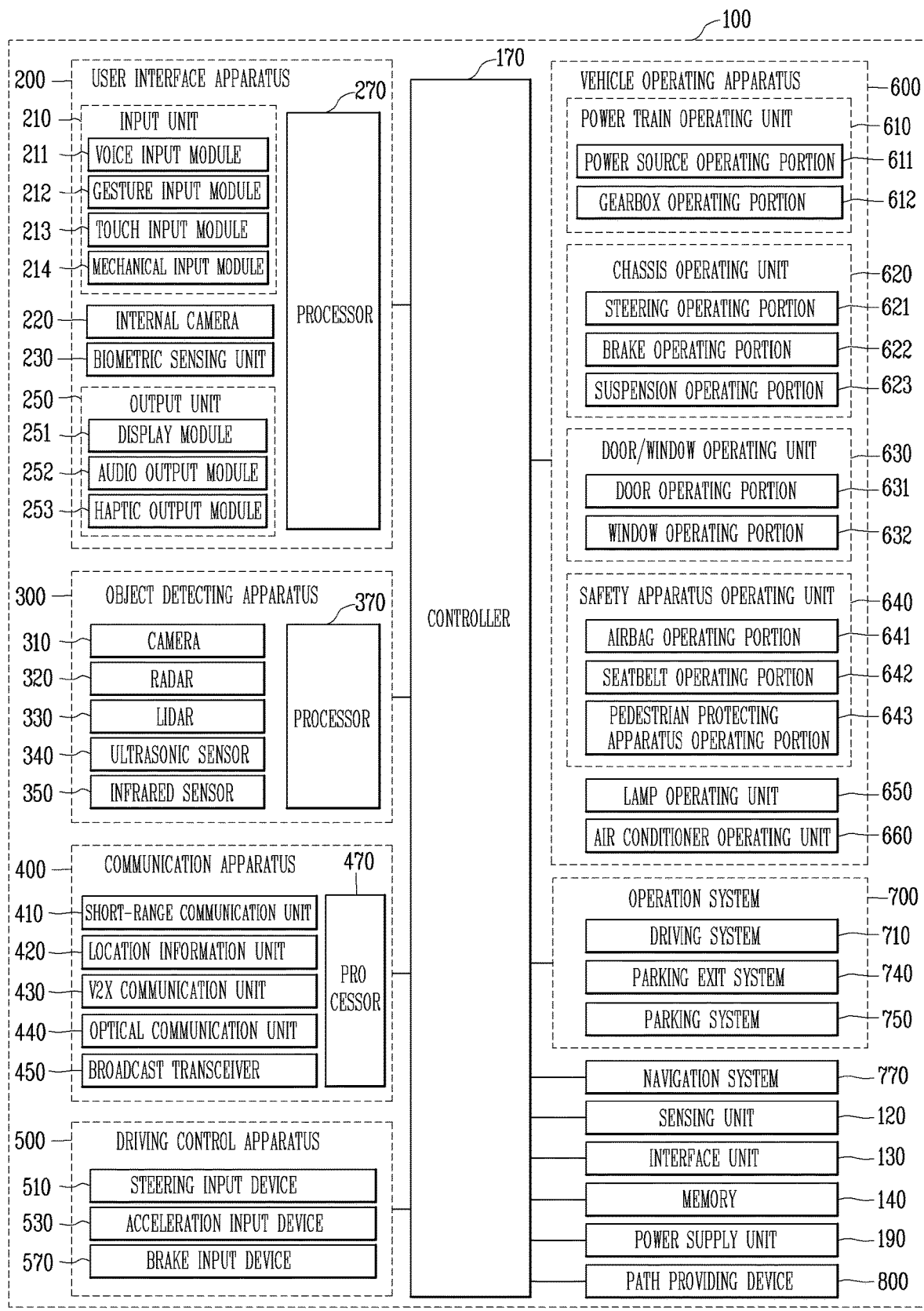
FIG. 7 is a block diagram of an exemplary vehicle.

For example, the vehicle 100 may be converted from the manual mode into the autonomous mode or from the autonomous mode into the manual mode based on a user input received through a user interface apparatus 200 in FIG. 7.

The vehicle 100 may be switched into the autonomous mode or the manual mode based on driving environment information. The driving environment information may be generated based on object information provided from an object detecting apparatus 300 in FIG. 7.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400 in FIG. 7.

The vehicle 100 may be switched from the manual mode into the autonomous mode or from the autonomous module into the manual mode based on information, data, or signal provided from an external device.

When the vehicle 100 is driven in the autonomous mode, the vehicle 100 may be driven based on an operation system 700.

For example, the autonomous vehicle 100 may be driven based on information, data or signal generated in a driving system 710, a parking exit system 740, and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170, a power supply unit 190, and a path providing device 800.

The vehicle 100 may include more components in addition to the components to be explained in this specification or may exclude one or more of the components described in this specification.

The user interface apparatus 200 is an apparatus that provides communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250, and at least one processor such as a processor 270.

The user interface apparatus 200 may include more components in addition to the components that are described in this specification or may exclude one or more of those components described in this specification.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on or around a steering wheel, an instrument panel, a seat, each pillar, a door, a center console, a headlining, a sun visor, a wind shield, a window or other suitable areas in the vehicle.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor or an image sensor for detecting the user's gesture input.

According to some implementations, the gesture input module 212 may detect a user's three-dimensional (3D) gesture input. For example, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door, and/or other suitable areas in the vehicle.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252, or a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display, and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Figure 3:
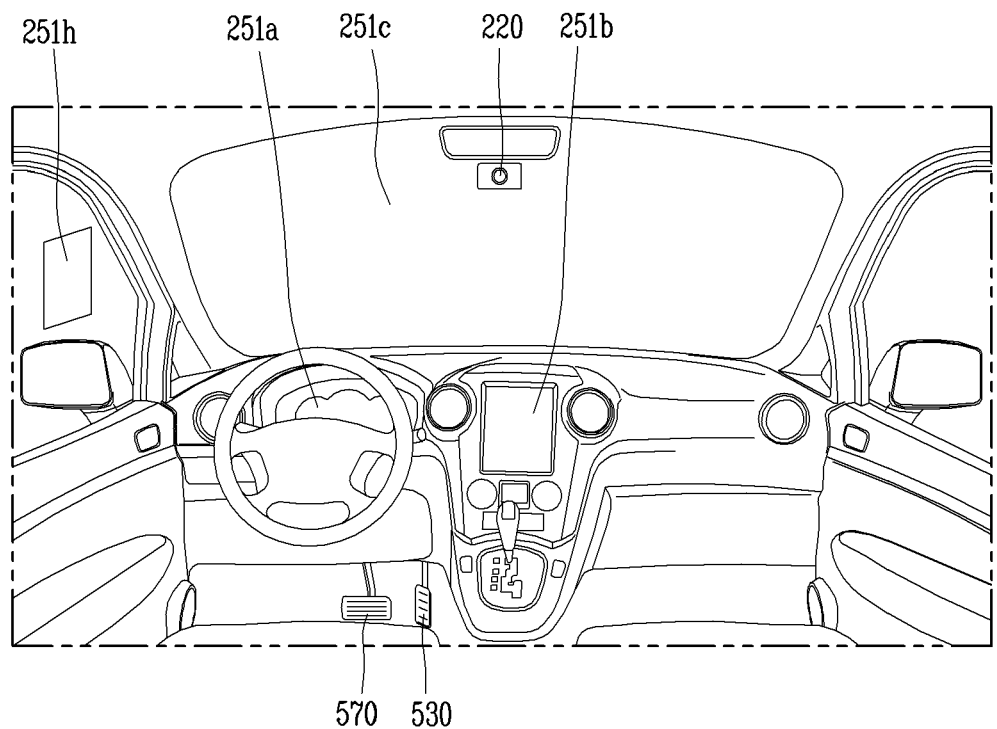
FIGS. 3 and 4 illustrate a vehicle interior.
Figure 4:
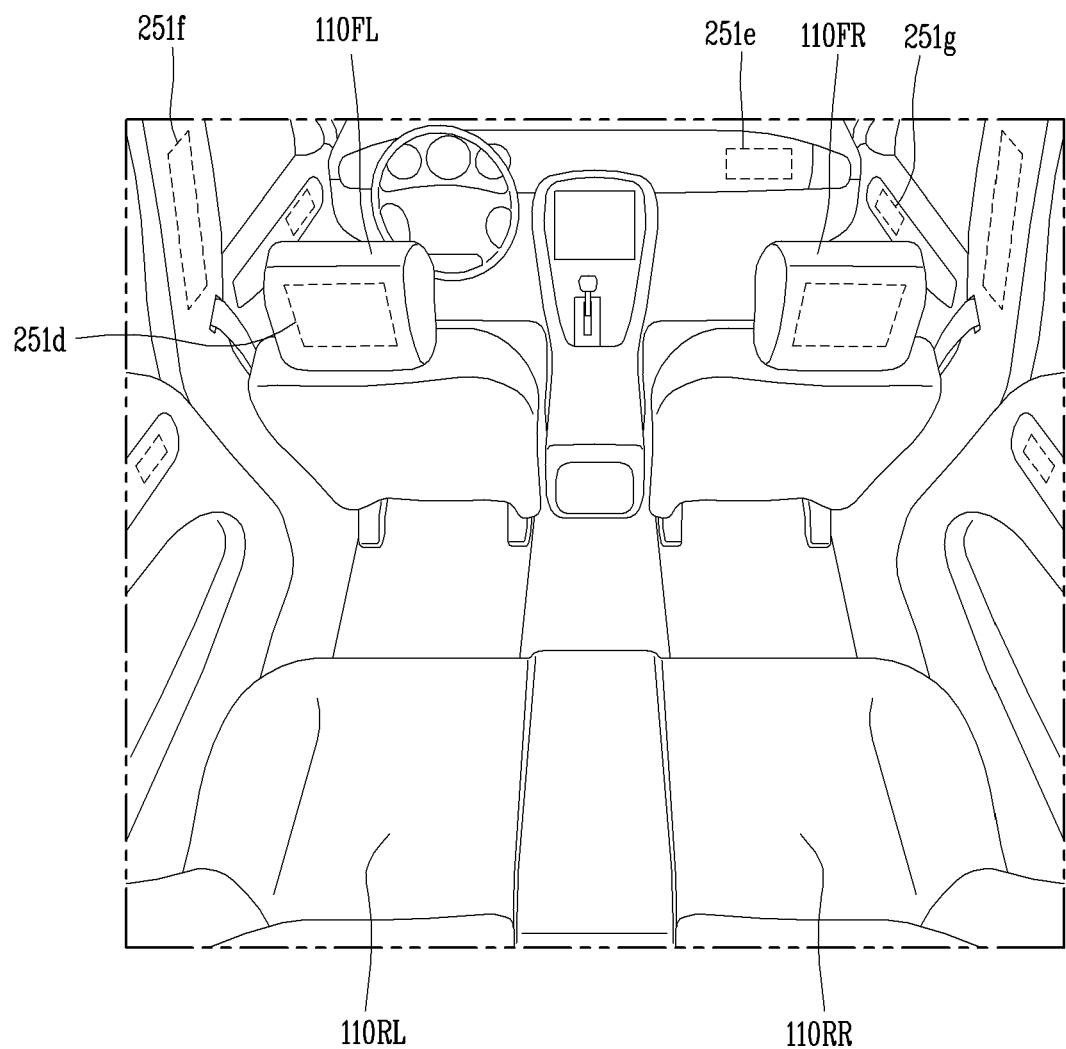
Figure 6:
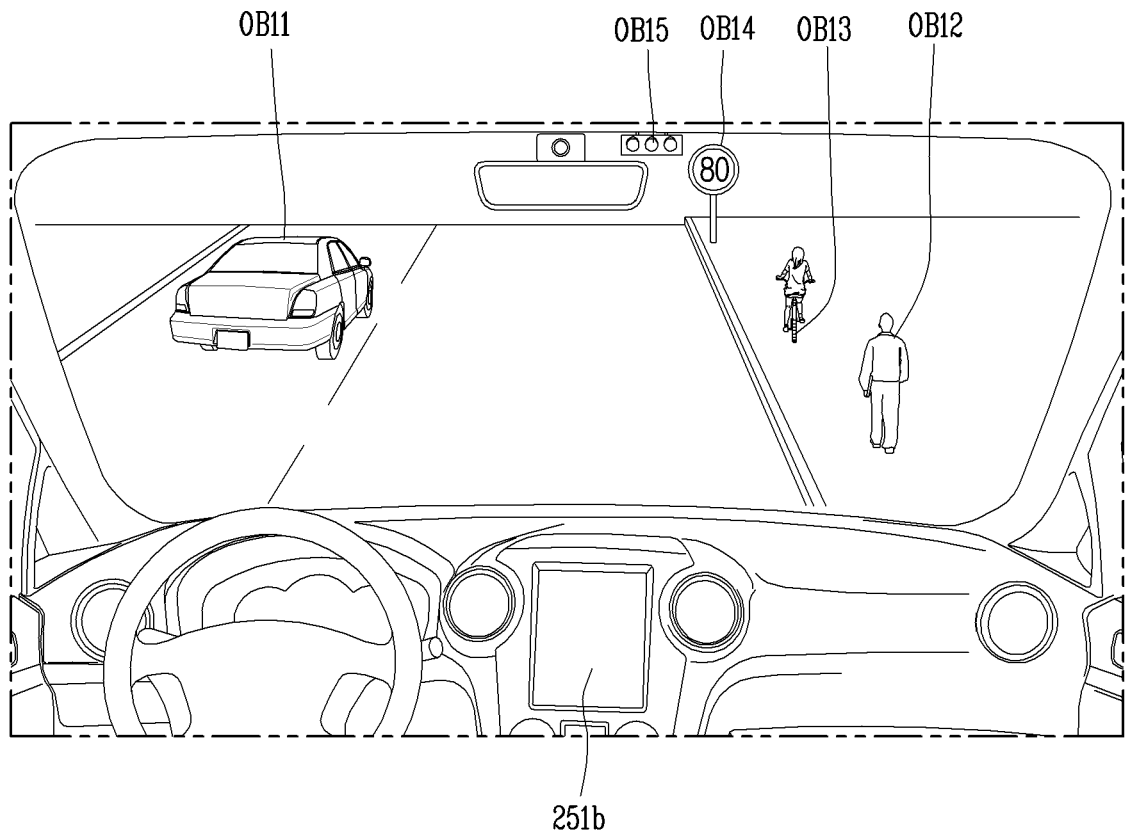

Meanwhile, the user interface apparatus 200 may include a plurality of display modules 251a to 251g as depicted in FIGS. 3, 4, and 6.

The display module 251 may be disposed on or around a steering wheel, instrument panels 251a, 251b, and 251e, (as depicted in FIGS. 3, 4, and 6), a seat 251d (as depicted in FIG. 4), each pillar 251f (as depicted in FIG. 4), a door 251g (as depicted in FIG. 4), a center console, a headlining or a sun visor, or implemented on or around a windshield 251c and/or a window 251h (as depicted in FIG. 3).

The audio output module 252 may convert an electric signal provided from the processor 270 or the controller 170 into an audio signal for output. For example, the audio output module 252 may include at least one speaker.

The haptic output module 253 may generate a tactile output. For example, the haptic output module 253 may vibrate the steering wheel, a safety belt, a seat 110FL, 110FR, 110RL, 110RR (in FIG. 4) such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

The user interface apparatus 200 may also be referred to herein as a display apparatus for vehicle.

In some implementations, the user interface apparatus 200 may operate according to the control of the controller 170.

Referring still to FIG. 7, the object detecting apparatus 300 is an apparatus for detecting an object located at outside of the vehicle 100.

The object may be a variety of objects associated with driving or operation of the vehicle 100.

Figure 5:
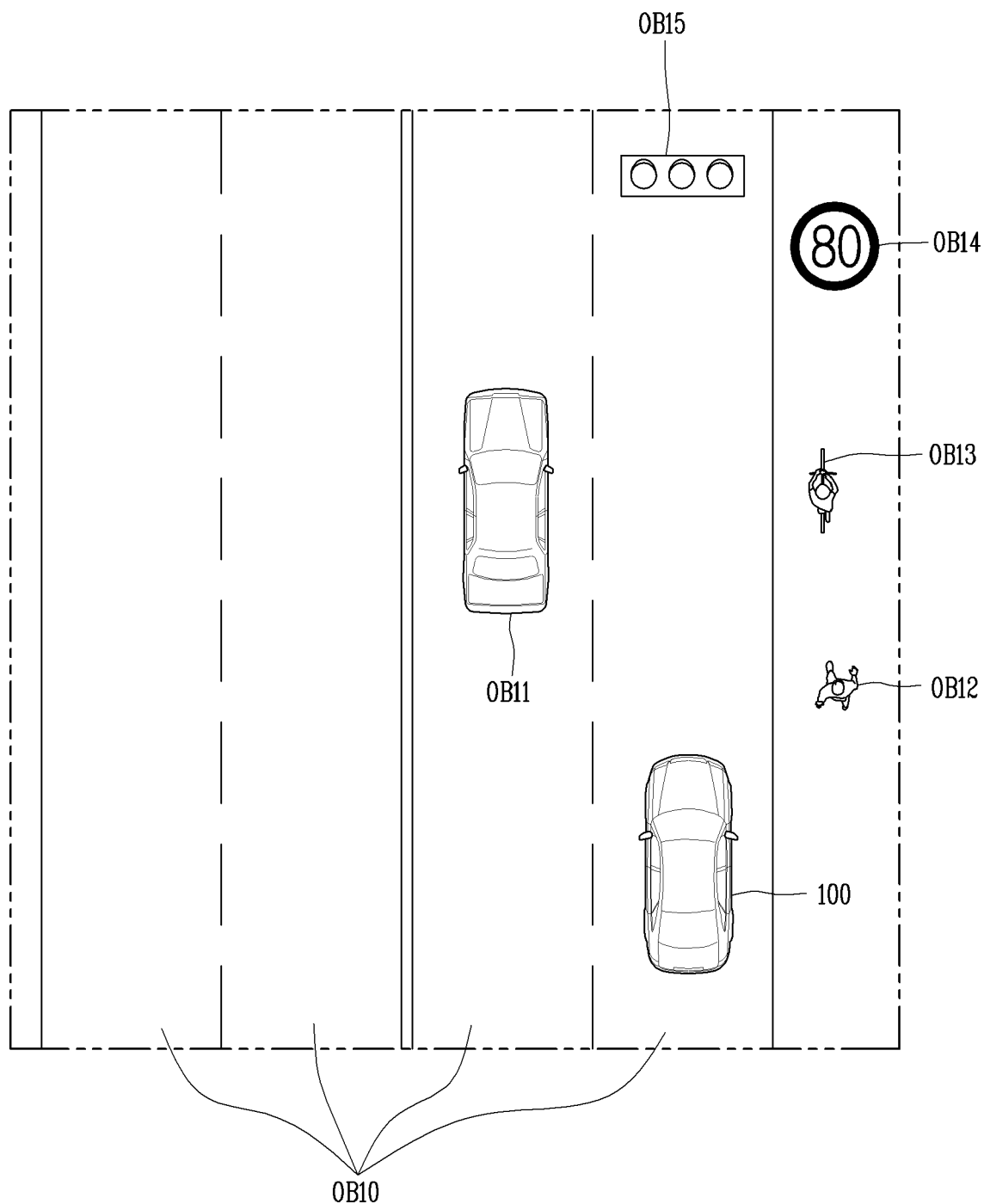
FIGS. 5 and 6 are diagrams referenced to describe objects.

Referring to FIGS. 5 and 6, an object O may include traffic lanes OB10, another vehicle OB11, a pedestrian OB12, a two-wheeled vehicle OB13, traffic signals OB14 and OB15, light, a road, a structure, a speed hump, a terrain, an animal, and other objects.

The lane OB10 may be a driving lane, a lane next to the driving lane, or a lane on which another vehicle comes in an opposite direction to the vehicle 100. Each lane OB10 may include left and right lines forming the lane.

The another vehicle OB11 may be a vehicle which is moving near the vehicle 100. The another vehicle OB11 may be a vehicle located within a predetermined distance from the vehicle 100. For example, the another vehicle OB11 may be a vehicle moving ahead of or behind the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

In some implementations, objects may be classified into a moving object and a fixed object. For example, the moving object may include another vehicle or a pedestrian. The fixed object may include, for example, a traffic signal, a road, or a structure.

Referring still to FIG. 7, the object detecting apparatus 300 may include a camera 310, a radar 320, a LiDAR 330, an ultrasonic sensor 340, an infrared sensor 350, and at least one processor such as a processor 370.

In some implementations, the object detecting apparatus 300 may further include other components in addition to the components described herein, or may exclude one or more of the components described herein.

Figure 2:
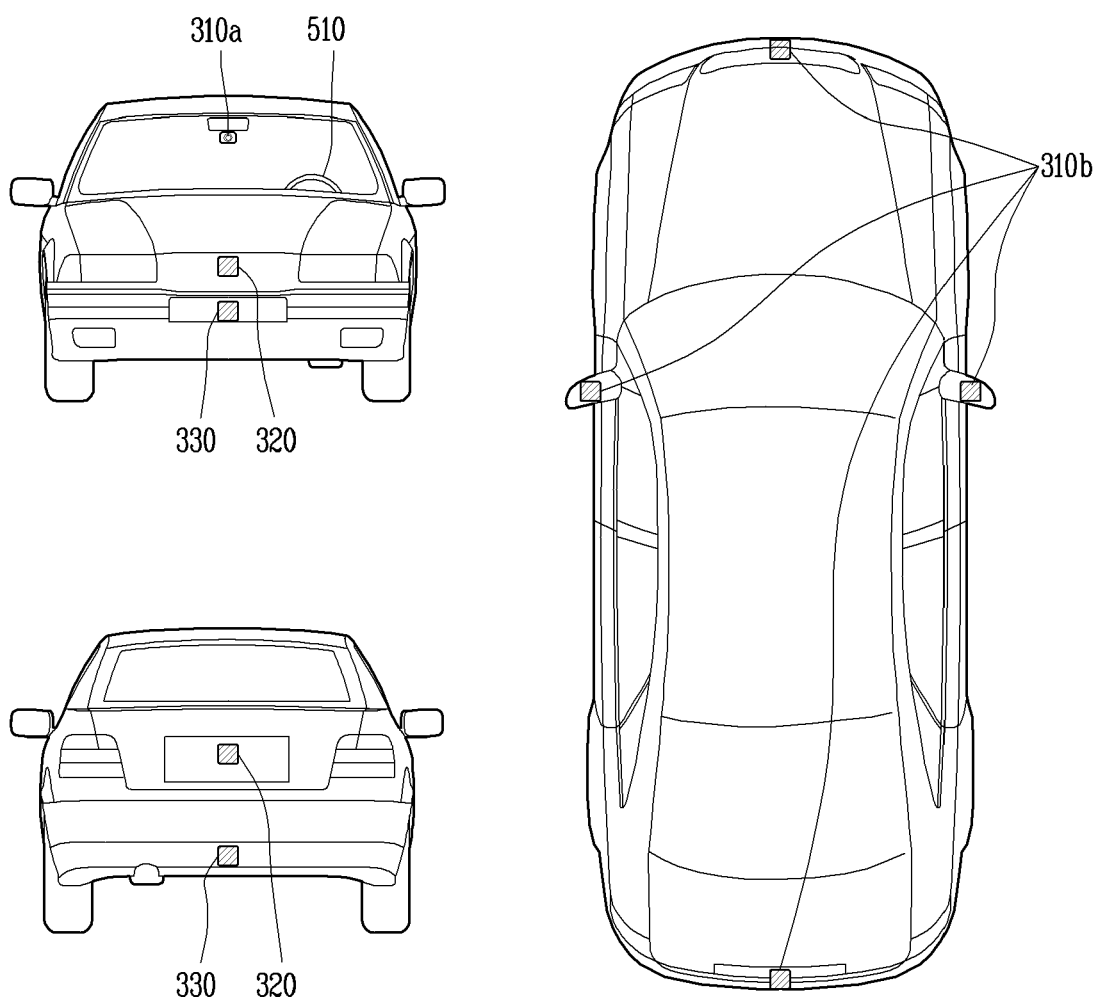
FIG. 2 illustrates a vehicle exterior from various angles.

The camera 310 may be located on an appropriate portion outside the vehicle to acquire an external image of the vehicle. The camera 310 may be a mono camera, a stereo camera 310a (as depicted in FIGS. 1 and 2), an around view monitoring (AVM) camera 310b (as depicted in FIG. 2) or a 360-degree camera.

In some implementations, the camera 310 may be disposed adjacent to a front windshield within the vehicle to acquire a front image of the vehicle. Alternatively or in addition, the camera 310 may be disposed adjacent to a front bumper or a radiator grill.

Alternatively or in addition, the camera 310 may be disposed adjacent to a rear glass within the vehicle to acquire a rear image of the vehicle. Alternatively or in addition, the camera 310 may be disposed adjacent to a rear bumper, a trunk or a tail gate.

Alternatively or in addition, the camera 310 may be disposed adjacent to at least one of side windows within the vehicle to acquire a side image of the vehicle. Alternatively or in addition, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle as depicted in FIG. 2.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a time of flight (TOP) manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle as depicted in FIG. 2.

The ultrasonic sensor 340 may include ultrasonic wave transmitting and receiving portions. The ultrasonic sensor 340 may detect an object based on an ultrasonic wave, and detect a position of the detected object, a distance from the detected object, and a relative speed with the detected object.

The ultrasonic sensor 340 may be disposed on an appropriate position outside the vehicle for detecting an object located at the front, rear, or side of the vehicle.

The infrared sensor 350 may include infrared light transmitting and receiving portions. The infrared sensor 350 may detect an object based on infrared light, and detect a position of the detected object, a distance from the detected object, and a relative speed with the detected object.

The infrared sensor 350 may be disposed on an appropriate position outside the vehicle for detecting an object located at the front, rear, or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave, which is generated when an emitted electromagnetic wave is reflected from the object, and track the object. The processor 370 may execute operations, such as a calculation of a distance from the object, a calculation of a relative speed with the object, and the like, based on the reflected electromagnetic wave.

The processor 370 may detect an object based on a reflected laser beam, which is generated when an emitted laser beam is reflected from the object, and track the object. The processor 370 may execute operations, such as a calculation of a distance from the object, a calculation of a relative speed with the object, and the like, based on the reflected laser beam.

The processor 370 may detect an object based on a reflected ultrasonic wave, which is generated when an emitted ultrasonic wave is reflected from the object, and track the object. The processor 370 may execute operations, such as a calculation of a distance from the object, a calculation of a relative speed with the object, and the like, based on the reflected ultrasonic wave.

The processor may detect an object based on reflected infrared light, which is generated when emitted infrared light is reflected from the object, and track the object. The processor 370 may execute operations, such as a calculation of a distance from the object, a calculation of a relative speed with the object, and the like, based on the reflected infrared light.

According to some implementations, the object detecting apparatus 300 may include a plurality of processors 370 or does not include the processor 370. In some implementations, each of the camera 310, the radar 320, the LiDAR 330, the ultrasonic sensor 340, and the infrared sensor 350 may include a processor, respectively.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for communicating with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to some implementations, the communication apparatus 400 may further include other components in addition to the components described herein, or may exclude one or more of the components described herein.

The short-range communication unit 410 is a unit for facilitating short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for communicating with an external device through the medium of light. The optical communication unit 440 may include a light-emitting diode for converting an electric signal into an optical signal and sending the optical signal to the exterior, and a photodiode for converting the received optical signal into an electric signal.

According to some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication apparatus 400.

According to some implementations, the communication apparatus 400 may include a plurality of processors 470 or does not include the processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

In some implementations, the communication apparatus 400 may operate according to the control of the controller 170.

Referring still to FIG. 7, the driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530, and a brake input device 570.

The steering input device 510 may receive an input regarding a driving (proceeding) direction of the vehicle 100 from the user. The steering input device 510 may refer to a wheel allowing a steering input in a rotating manner. According to some implementations, the steering input device 510 may also refer to a touch screen, a touch pad, or a button.

The acceleration input device 530 may receive an input for accelerating the vehicle 100 from the user. The brake input device 570 may receive an input for braking the vehicle 100 from the user. Each of the acceleration input device 530 and the brake input device 570 may refer to a pedal. According to some implementations, the acceleration input device 530 or the brake input device 570 may also refer to a touch screen, a touch pad, or a button.

In some implementations, the driving control apparatus 500 may operate according to the control of the controller 170.

Referring still to FIG. 7, the vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include a processor. Alternatively or in addition, each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

In other example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N), or parking (P).

For example, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622, and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

Referring still to FIG. 7, the safety apparatus operating unit 640 may perform an electronic control for various safety apparatuses within the vehicle 100.

The safety apparatus operating unit 640 may include an airbag operating portion 641, a seatbelt operating portion 642, and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, and 110RR (depicted in FIG. 4) using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

Referring still to FIG. 7, the lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when an internal temperature of the vehicle is high.

In some implementations, the vehicle operating apparatus 600 may include a processor. Each unit of the vehicle operating apparatus 600 may individually include a processor.

In some implementations, the vehicle operating apparatus 600 may operate according to the control of the controller 170.

Referring still to FIG. 7, the operation system 700 is a system that controls various driving modes of the vehicle 100. The operation system 700 may operate in an autonomous driving mode.

The operation system 700 may include a driving system 710, a parking exit system 740, and a parking system 750.

According to implementations, the operation system 700 may further include other components in addition to the components described herein, or may exclude one or more of the components described herein.

In some implementations, the operation system 700 may include at least one processor. Alternatively, or in addition, each unit of the operation system 700 may individually include at least one processor.

According to some implementations, the operation system 700 may be implemented by the controller 170 when it is implemented in a software configuration.

In some implementations, the operation system 700 may include at least one of the user interface apparatus 200, the object detecting apparatus 300, the communication apparatus 400, the vehicle operating apparatus 600, or the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600, and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770 and transmit a control signal to the vehicle operating apparatus 600 to park the vehicle 100.

The parking system 750 may receive object information from the object detecting apparatus 300, and transmit a control signal to the vehicle operating apparatus 600 to park the vehicle 100.

The parking system 750 may receive a signal from an external device through the communication apparatus 400, and transmit a control signal to the vehicle operating apparatus 600 to park the vehicle 100.

The navigation system 770 may provide navigation information. The navigation information may include at least one of map information, information regarding a set destination, path information according to the set destination, information regarding various objects on a path, lane information, and current location information of the vehicle 100.

The navigation system 770 may include a memory and a processor. The memory may store the navigation information. The processor may control an operation of the navigation system 770.

According to some implementations, the navigation system 770 may update stored information by receiving information from an external device through the communication apparatus 400.

According to some implementations, the navigation system 770 may be classified as a sub component of the user interface apparatus 200.

The sensing unit 120 may detect a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal, and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 according to the present disclosure may include a path providing device 800.

The path providing device 800 may control at least one of those components illustrated in FIG. 7. From this perspective, the path providing device 800 may be the controller 170.

Without a limit to this, the path providing device 800 may be a separate device, independent of the controller 170. When the path providing device 800 is implemented as a component independent of the controller 170, the path providing device 800 may be provided on a part of the vehicle 100.

Hereinafter, description will be given of implementations in which the path providing device 800 is a component which is separate from the controller 170, for the sake of explanation. As such, according to implementations described in this disclosure, the functions (operations) and control techniques described in relation to the path providing device 800 may be executed by the controller 170 of the vehicle. That is, every detail described in relation to the path providing device 800 may be applied to the controller 170 in the same/similar manner.

Also, the path providing device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of a method of autonomously driving a vehicle related to the present disclosure in an optimized manner or providing path information optimized for the travel the vehicle, with reference to the accompanying drawings.

Figure 8:
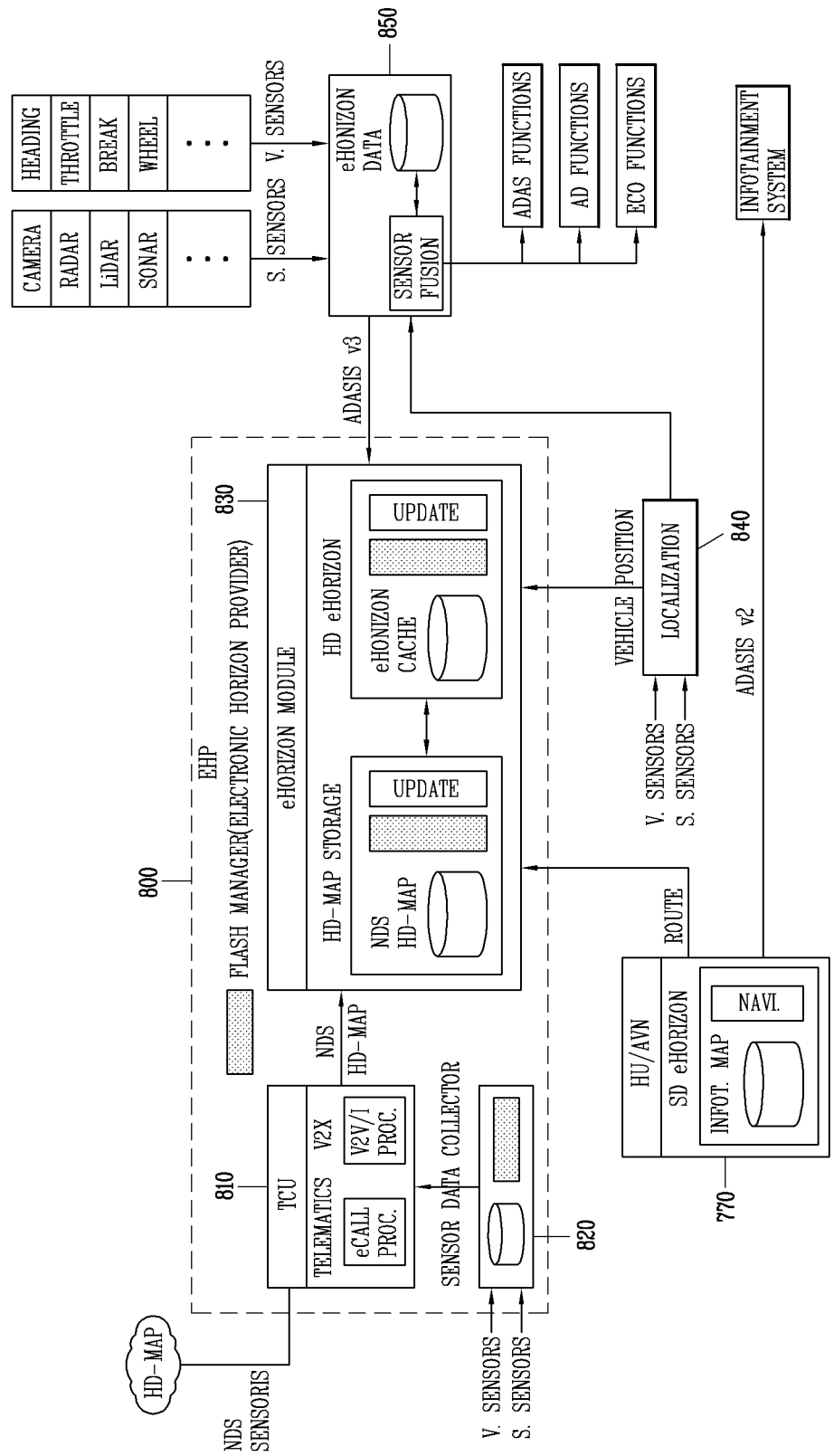
FIG. 8 is a diagram of an exemplary Electronic Horizon Provider (EHP).

FIG. 8 is a diagram of an exemplary Electronic Horizon Provider (EHP).

Referring to FIG. 8, a path providing device 800 may autonomously control the vehicle 100 based on eHorizon (electronic Horizon).

The path providing device 800 may be an electronic horizon provider (EHP).

In some implementations, Electronic Horzion may refer to 'ADAS Horizon', 'ADASIS Horizon', 'Extended Driver Horizon' or 'eHorizon'.

The eHorizon may be a software, a module, or a system that performs operations including generating vehicle's forward path information (e.g., using high-definition (HD) map data), configuring the vehicle's forward path information based on a specified standard (protocol) (e.g., a standard specification defined by the ADAS), and transmitting the configured vehicle forward path information to an application (e.g., an ADAS application, a map application, etc.) which may be installed in a module (e.g., an ECU, the controller 170, the navigation system 770, etc.) of the vehicle or in the vehicle requiring map information (or path information).

In some implementations, the vehicle's forward path (or a path to the destination) may be provided as a single path based on a navigation map. In some implementations, eHorizon may provide lane-based path information based on a high-definition (HD) map.

Data generated by eHorizon may refer to 'electronic horizon data' or 'eHorizon data'.

The electronic horizon data may be driving plan data which is used to generate a driving control signal of the vehicle 100 in a driving (traveling) system. For example, the electronic horizon data may be driving plan data which provides a range from a point where the vehicle 100 is located to horizon.

The horizon may be a point in front of a location of the vehicle 100, by a preset distance, on the basis of a preset travel path. The horizon may refer to a point where the vehicle 100 is to reach after a predetermined time from the point, at which the vehicle 100 is currently located, along a preset travel path. Here, the travel path refers to a path for the vehicle to travel up to a final destination, and may be set by a user input.

Electronic horizon data may include horizon map data and horizon path data. The horizon map data may include at least one of topology data, ADAS data, HD map data, or dynamic data. According to some implementations, the horizon map data may include a plurality of layers of data. For example, the horizon map data may include a first layer that matches topology data, a second layer that matches ADAS data, a third layer that matches HD map data, and a fourth layer that matches dynamic data. The horizon map data may further include static object data.

Topology data may be a map created by connecting road centers. Topology data may indicate a position of a vehicle and may be in the form of data used in a navigation for a driver. For example, topology data may be road information excluding lane-related information. Topology data may be generated based on data received by an infrastructure through V2I. For example, topology data may be based on data generated in the infrastructure. By way of further example, topology data may be based on data stored in at least one memory included in the vehicle 100.

ADAS data may refer to data related to road information. ADAS data may include at least one of road slope data, road curvature data, or road speed limit data. ADAS data may further include no-passing zone data. ADAS data may be based on data generated in an infrastructure. In some implementations, ADAS data may be based on data generated by the object detecting apparatus 300. ADAS data may be named road information data.

HD map data may include detailed lane-unit topology information of a road, connection information of each lane, and feature information for localization of a vehicle (e.g., traffic signs, lane marking/attributes, road furniture, etc.). HD map data may be based on data generated in an infrastructure.

Dynamic data may include various dynamic information that may be generated on a road. For example, the dynamic data may include construction information, variable-speed lane information, road surface state information, traffic information, moving object information, and any other information associated with the road. Dynamic data may be based on data received by an infrastructure. In some implementations, dynamic data may be based on data generated by the object detecting apparatus 300.

The path providing device 800 may provide map data within a range from a location of the vehicle 100 to the horizon. The horizon path data may be a trajectory that the vehicle 100 can take within the range from the location of the vehicle 100 to the horizon. The horizon path data may include data indicating a relative probability to select one road at a decision point (e.g., fork, intersection, crossroads, etc.). Relative probability may be calculated based on a time taken to arrive at a final destination. For example, if a shorter time is taken to arrive at the final destination by selecting a first road than selecting a second road at a decision point, the probability to select the first road may be calculated higher than the probability to select the second road.

The horizon path data may further include a main path and a sub path. The main path may be a trajectory connecting roads with a higher relative probability to be selected. The sub path may be merged with or diverged from at least one point on the main path. The sub path may be a trajectory connecting at least one road having a low relative probability to be selected at the at least one decision point on the main path.

eHorizon may be classified into categories such as software, a system, and the like. eHorizon denotes a configuration of aggregating real-time events, such as road shape information of a high-definition map, real-time traffic signs, road surface conditions, accidents and the like, under a connected environment of an external server (cloud server), V2X (Vehicle to everything) or the like, and providing the information related to the aggregated real-time events to the autonomous driving system and the infotainment system.

In some implementations, eHorizon may transfer a road shape on a high-definition map and real-time events with respect to the front of the vehicle to the autonomous driving system and the infotainment system under an external server/V2X environment.

In order to effectively transfer eHorizon data (information) transmitted from eHorizon (i.e., external server) to the autonomous driving system and the infotainment system, a data specification and transmission method may be formed in accordance with a technical standard called "Advanced Driver Assistance Systems Interface Specification (ADASIS)."

The vehicle 100 may use information, which is received (generated) in eHorizon, in an autonomous driving system and/or an infotainment system. For example, the autonomous driving system may use information provided by eHorizon in safety and ECO aspects.

In terms of the safety aspect, the vehicle 100 may perform an Advanced Driver Assistance System (ADAS) function such as Lane Keeping Assist (LKA), Traffic Jam Assist (TJA) or the like, and/or an AD (AutoDrive) function such as passing, road joining, lane change or the like, by using road shape information and event information received from eHorizon and surrounding object information sensed through the localization unit 840 provided in the vehicle.

Furthermore, in terms of the ECO aspect, the path providing device 800 may receive slope information, traffic light information, and the like related to a forward road from eHorizon, to control the vehicle so as to get efficient engine output, thereby enhancing fuel efficiency.

The infotainment system may include convenience aspect. For example, the vehicle 100 may receive from eHorizon accident information, road surface condition information, and the like related to a road ahead of the vehicle, and output the received information on a display unit (e.g., Head Up Display (HUD), CID, Cluster, etc.) provided in the vehicle, so as to provide guide information for the driver to drive the vehicle safely.

eHorizon may receive position information related to various types of event information (e.g., road surface condition information, construction information, accident information, etc.) occurred on roads and/or road-based speed limit information from the vehicle 100 or other vehicles or may collect such information from infrastructures (e.g., measuring devices, sensing devices, cameras, etc.) installed on the roads.

In addition, the event information and the road-based speed limit information may be linked to map information or may be updated.

In addition, the position information related to the event information may be divided into lane units.

By using such information, the eHorizon system (EHP) can provide information necessary for the autonomous driving system and the infotainment system to each vehicle, based on a high-definition map on which road conditions (or road information) can be determined on the lane basis. For example, an Electronic Horizon (eHorizon) Provider (EHP) may provide an high-definition map using coordinates of road-related information (for example, event information, position information regarding the vehicle 100, etc.) based on a high-definition map.

The road-related information provided by the eHorizon may be information included in a predetermined area (predetermined space) with respect to the vehicle 100.

The EHP may be a component which is included in an eHorizon system and configured to perform functions provided by the eHorizon (or eHorizon system).

The path providing device 800 may be EHP, as shown in FIG. 8.

The path providing device 800 (EHP) may receive a high-definition map from an external server (or a cloud server), generate path (route) information to a destination with respect to one or more lanes of a road, and transmit the high-definition map and the path information generated with respect to the one or more lanes to a module or application (or program) of the vehicle requiring the map information and the path information.

Referring to FIG. 8, FIG. 8 illustrates an exemplary overall structure of an Electronic Horizon (eHorizon) system.

The path providing device 800 (EHP) may include a telecommunication control unit (TCU) 810 that receives a high-definition map (HD-map) from a cloud server.

The TCU 810 may be the communication apparatus 400 described above, and may include at least one of components included in the communication apparatus 400.

The TCU 810 may include a telematics module or a vehicle to everything (V2X) module.

The TCU 810 may receive an HD map that complies with the Navigation Data Standard (NDS) (or conforms to the NDS standard) from the cloud server.

In addition, the HD map may be updated by reflecting data sensed by sensors provided in the vehicle and/or sensors installed around road, according to the sensor ingestion interface specification (SENSORIS).

The TCU 810 may download the HD map from the cloud server through the telematics module or the V2X module.

In addition, the path providing device 800 may include an interface unit 820. In some implementations, the interface unit 820 may receive sensing information from one or more sensors provided in the vehicle 100.

The interface unit 820 may refer to a sensor data collector. The interface unit 820 may collect or receive information sensed by sensors (V.Sensors) provided in the vehicle for detecting a manipulation of the vehicle (e.g., heading, throttle, break, wheel, etc.) and sensors (S.Sensors) for detecting surrounding information of the vehicle (e.g., Camera, Radar, LiDAR, Sonar, etc.)

The interface unit 820 may transmit the information sensed through the sensors provided in the vehicle to the TCU 810 (or processor 830) to reflect the information in the HD map.

TCU 810 may update the HD map stored in the cloud server by transmitting the information transmitted from the interface unit 820 to the cloud server.

The path providing device 800 may include a processor 830 (or an eHorizon module).

The processor 830 may control the TCU 810 and the interface unit 820.

The processor 830 may store the HD map received through the TCU 810, and update the HD map using the information received through the interface unit 820. This operation may be performed in a storage part of the processor 830.

The processor 830 may receive first path information from an audio video navigation (AVN) or a navigation system 770.

The first path information may be route information provided in conventional systems and may be information for guiding a traveling path (travel path, driving path, driving route) to a destination. For example, the first path information provided by the conventional systems provides only one path information and does not distinguish lanes. In contrast, when the processor 830 receives the first path information, the processor 830 may generate second path information for guiding, with respect to one or more lanes of a road, a traveling path up to the destination set in the first path information, by using the HD map and the first path information. For example, the operation may be performed by a calculating part of the processor 830.

In addition, the eHorizon system may include a localization unit 840 for identifying the position of the vehicle by using information sensed through the sensors (V. Sensors, S.Sensors) provided in the vehicle.

The localization unit 840 may transmit the position information of the vehicle to the processor 830 to match the position of the vehicle identified by using the sensors provided in the vehicle with the HD map.

The processor 830 may match the position of the vehicle 100 with the HD map based on the position information of the vehicle.

The processor 830 may generate horizon data, electronic horizon data, and horizon path data.

The processor 830 may generate the electronic horizon data by reflecting the traveling (driving) situation of the vehicle 100. For example, the processor 830 may generate the electronic horizon data based on traveling direction data and traveling speed data of the vehicle 100.

The processor 830 may merge the generated electronic horizon data with previously-generated electronic horizon data. For example, the processor 830 may connect horizon map data generated at a first time point with horizon map data generated at a second time point on the position basis. For example, the processor 830 may connect horizon path data generated at a first time point with horizon path data generated at a second time point on the position basis.

The processor 830 may include a memory, an HD map processing part, a dynamic data processing part, a matching part, and a path generating part.

The HD map processing part may receive HD map data from a server through the TCU. The HD map processing part may store the HD map data. According to some implementations, the HD map processing part may also process the HD map data. The dynamic data processing part may receive dynamic data from the object detecting device. The dynamic data processing part may receive the dynamic data from a server. The dynamic data processing part may store the dynamic data. In some implementations, the dynamic data processing part may process the dynamic data.

The matching part may receive an HD map from the HD map processing part. The matching part may receive dynamic data from the dynamic data processing part. The matching part may generate horizon map data by matching the HD map data with the dynamic data.

According to some implementations, the matching part may receive topology data. The matching part may receive ADAS data. The matching part may generate horizon map data by matching the topology data, the ADAS data, the HD map data, and the dynamic data. The path generating part may generate horizon path data. The path generating part may include a main path generator and a sub path generator. The main path generator may generate main path data. The sub path generator may generate sub path data.

In addition, the eHorizon system may include a fusion unit 850 for fusing information (data) sensed through the sensors provided in the vehicle and eHorizon data generated by the eHorizon module (control unit). For example, the fusion unit 850 may update an HD map by fusing sensing data sensed by the vehicle with an HD map corresponding to eHorizon data, and provide the updated HD map to an ADAS function, an AD (AutoDrive) function, or an ECO function.

In addition, the fusion unit 850 may provide the updated HD map to the infotainment system.

FIG. 8 illustrates that the path providing device 800 merely includes the TCU 810, the interface unit 820, and the processor 830, but the present disclosure is not limited thereto.

The path providing device 800 of the present disclosure may further include at least one of the localization unit 840 or the fusion unit 850.

In addition or alternatively, the path providing device 800 (EHP) may further include a navigation system 770.

With such a configuration, when at least one of the localization unit 840, the fusion unit 850, or the navigation system 770 is included in the path providing device 800 (EHP), the functions/operations/controls performed by the included configuration may be understood as being performed by the processor 830.

Figure 9:
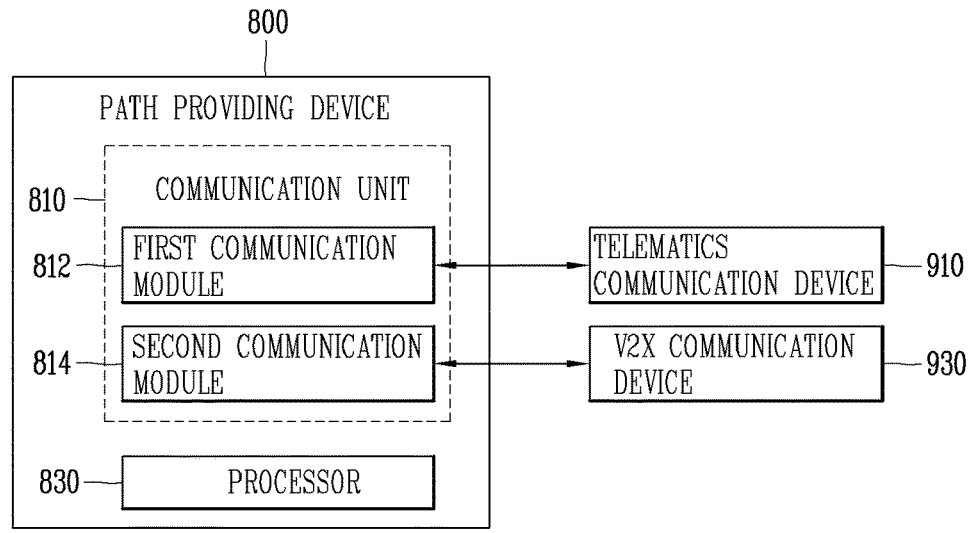
FIG. 9 is a block diagram of an exemplary path providing device of FIG. 8.

FIG. 9 is a block diagram of an exemplary path providing device (e.g., the path providing device of FIG. 8).

The path providing device refers to a device for providing a route (or path) to a vehicle. For example, the path providing device may be a device mounted on a vehicle to perform communication through CAN communication and generate messages for controlling the vehicle and/or electric components mounted on the vehicle. By way of further example, the path providing device may be located outside the vehicle, like a server or a communication device, and may perform communication with the vehicle through a mobile communication network. In this case, the path providing device may remotely control the vehicle and/or the electric components mounted on the vehicle using the mobile communication network.

The path providing device 800 is provided in the vehicle, and may be implemented as an independent device detachable from the vehicle or may be integrally installed on the vehicle to construct a part of the vehicle 100.

Referring to FIG. 9, the path providing device 800 may include a communication unit (TCU) 810, an interface unit 820, and a processor 830.

The communication unit 810 may be configured to perform communications with various components provided in the vehicle. For example, the communication unit 810 may receive various information provided through a controller area network (CAN).

The communication unit 810 may include a first communication module 812, and the first communication module 812 may receive an HD map provided through telematics. For example, the first communication module 812 may be configured to perform 'telematics communication'. The first communication module 812 performing the telematics communication may communicate with a server and the like by using a satellite navigation system or a base station provided by mobile communications such as 4G or 5G.

The first communication module 812 may communicate with a telematics communication device 910. The telematics communication device 910 may include a server provided by a portal provider, a vehicle provider, and/or a mobile communication company.

The processor 830 of the path providing device 800 may determine absolute coordinates of road-related information (event information) based on ADAS MAP received from an external server (eHorizon) through the first communication module 812. In addition, the processor 830 may autonomously drive the vehicle or perform a vehicle control using the absolute coordinates of the road-related information (event information).

The TCU 810 may include a second communication module 814, and the second communication module 814 may receive various types of information provided through vehicle to everything (V2X) communication. For example, the second communication module 814 may be configured to perform 'V2X communication'. The V2X communication may be a technology of exchanging or sharing information, such as traffic condition and the like, while communicating with road infrastructures and other vehicles during driving.

The second communication module 814 may communicate with a V2X communication device 930. The V2X communication device 930 may include a mobile terminal associated with a pedestrian or a person riding a bike, a fixed terminal installed on a road, another vehicle, and the like.

Here, the another vehicle may denote at least one of vehicles existing within a predetermined distance from the vehicle 100 or vehicles approaching by a predetermined distance or shorter with respect to the vehicle 100.

The present disclosure may not be limited thereto, and the another vehicle may include all the vehicles capable of performing communication with the TCU 810. According to this specification, for the sake of explanation, an example will be described in which the another vehicle is at least one vehicle existing within a predetermined distance from the vehicle 100 or at least one vehicle approaching by a predetermined distance or shorter with respect to the vehicle 100.

The predetermined distance may be determined based on a distance capable of performing communication through the TCU 810, determined according to a specification of a product, or determined/varied based on a user's setting or V2X communication standard.

The second communication module 814 may be configured to receive LDM data from another vehicle. The LDM data may be a V2X message (BSM, CAM, DENM, etc.) transmitted and received between vehicles through V2X communication. The LDM data may include position information related to the another vehicle.

The processor 830 may determine a position of the vehicle 100 relative to the another vehicle, based on the position information related to the vehicle 100 and the position information related to the another vehicle included in the LDM data received through the second communication module 814.

In addition, the LDM data may include speed information regarding another vehicle. The processor 830 may also determine a relative speed of the another vehicle using speed information of the vehicle 100 and the speed information of the another vehicle. The speed information of the vehicle 100 may be calculated using a degree to which the location information of the vehicle received through the TCU 810 changes over time or calculated based on information received from the driving control apparatus 500 or the power train operating unit 610 of the vehicle 100.

The second communication module 814 may be the V2X communication unit 430 described above.

If the TCU 810 is a component that performs communication with a device located outside the vehicle 100 using wireless communication, the interface unit 820 may be a component performing communication with a device located inside the vehicle 100 using wired or wireless communication.

The interface unit 820 may receive information related to driving of the vehicle from most of electric components provided in the vehicle 100. Information transmitted from the electric component provided in the vehicle to the path providing device 800 is referred to as 'vehicle driving information (or vehicle travel information)'. For example, when the electric component is a sensor, the vehicle driving information may be sensing information sensed by the sensor.

Vehicle driving information may include vehicle information and surrounding information related to the vehicle. Information related to the inside of the vehicle with respect to a frame of the vehicle may be defined as the vehicle information, and information related to the outside of the vehicle may be defined as the surrounding information.

The vehicle information refers to information related to the vehicle itself. For example, the vehicle information may include a traveling speed, a traveling direction, an acceleration, an angular velocity, a location (GPS), a weight, a number of passengers on board the vehicle, a braking force of the vehicle, a maximum braking force, air pressure of each wheel, a centrifugal force applied to the vehicle, a driving (or travel) mode of the vehicle (autonomous driving mode or manual driving mode), a parking mode of the vehicle (autonomous parking mode, automatic parking mode, manual parking mode), whether or not a user is on board the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a preceding (or following) vehicle, a relative speed of a preceding (or following) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may also include ambient brightness, temperature, a position of the sun, information related to a nearby subject (a person, another vehicle, a sign, etc.), a type of a driving road surface, a landmark, line information, and driving lane information, and information required for an autonomous driving/autonomous parking/automatic parking/manual parking mode.

In addition, the surrounding information may further include a distance from an object existing around the vehicle to the vehicle, collision possibility, a type of an object, a parking space for the vehicle, an object for identifying the parking space (e.g., a parking line, a string, another vehicle, a wall, etc.), and the like.

The vehicle driving information is not limited to the example described above and may include all information generated from the components provided in the vehicle.

In some implementations, the processor 830 may be configured to control one or more electric components provided in the vehicle using the interface unit 820.

For example, the processor 830 may determine whether or not at least one of a plurality of preset or predetermined conditions is satisfied, based on vehicle driving information received through the TCU 810. Based on a satisfied condition, the processor 830 may control the one or more electric components in different ways.

In connection with the preset conditions, the processor 830 may detect an occurrence of an event in an electric component provided in the vehicle and/or application, and determine whether the detected event meets a preset condition. At this time, the processor 830 may also detect the occurrence of the event from information received through the TCU 810.

The application may be implemented, for example, as a widget, a home launcher, and the like, and may refer to various types of programs that can be executed on the vehicle. Accordingly, the application may be a program that performs various functions, such as a web browser, a video playback, message transmission/reception, schedule management, or application update.

In addition, the application may include at least one of forward collision warning (FCW), blind spot detection (BSD), lane departure warning (LDW), pedestrian detection (PD), Curve Speed Warning (CSW), or turn-by-turn navigation (TBT). For example, the occurrence of the event may be a missed call, presence of an application to be updated, a message arrival, start on, start off, autonomous travel on/off, pressing of an LCD awake key, an alarm, an incoming call, a missed notification, and the like.

In some implementations, the occurrence of the event may be a generation of an alert set in the advanced driver assistance system (ADAS), or an execution of a function set in the ADAS. For example, the occurrence of the event may be an occurrence of forward collision warning, an occurrence of blind spot detection, an occurrence of lane departure warning, an occurrence of lane keeping assist warning, or an execution of autonomous emergency braking.

In some implementations, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various electronic control units (ECUs) provided in the vehicle perform specific functions, it may be determined as the occurrence of the events. For example, when a generated event satisfies the preset condition, the processor 830 may control the interface unit 820 to display information corresponding to the satisfied condition on one or more displays provided in the vehicle.

Figure 10:
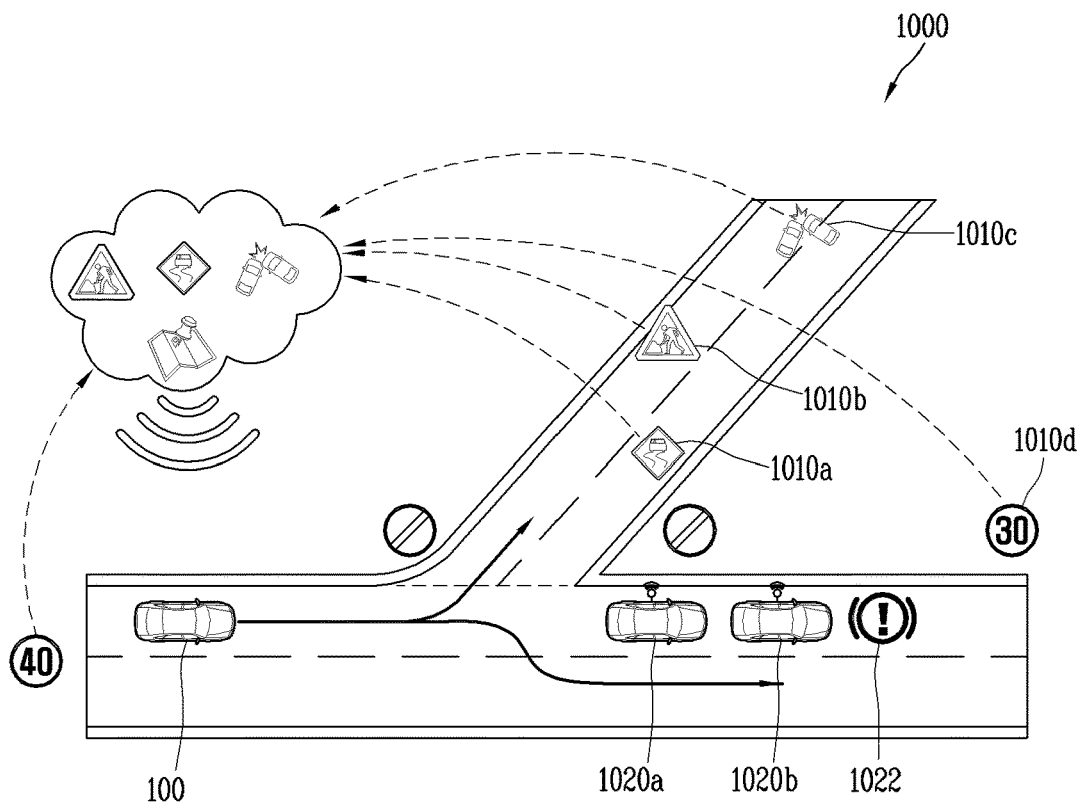
FIG. 10 is a diagram of an exemplary eHorizon.

FIG. 10 is a diagram of an exemplary eHorizon.

Referring to FIG. 10, the path providing device 800 may autonomously drive the vehicle 100 based on the eHorizon.

eHorizon may be classified into categories such as software, a system, and the like. The eHorizon denotes a configuration in which road shape information on a detailed map under a connected environment of an external server (cloud), V2X (Vehicle to everything) or the like and real-time events such as real-time traffic signs, road surface conditions, accidents and the like are merged to provide relevant information to autonomous driving systems and infotainment systems. For an example, eHorizon may refer to an external server (a cloud or a cloud server). By way of further example, eHorizon may transfer a road shape on a high-definition map and real-time events with respect to the front of the vehicle to the autonomous driving system and the infotainment system under an external server/V2X environment.

In order to effectively transfer eHorizon data (information) transmitted from eHorizon (i.e., external server) to the autonomous driving system and the infotainment system, a data specification and transmission method may be formed in accordance with a technical standard called "Advanced Driver Assistance Systems Interface Specification (ADASIS)."

The path providing device 800 may use information, which is received from eHorizon, in the autonomous driving system and/or the infotainment system. For example, the autonomous driving system may be divided into a safety aspect and an ECO aspect.

In terms of the safety aspect, the vehicle 100 may perform an Advanced Driver Assistance System (ADAS) function such as Lane Keeping Assist (LKA), Traffic Jam Assist (TJA) or the like, and/or an AD (AutoDrive) function such as passing, road joining, lane change or the like, by using road shape information and event information received from eHorizon and surrounding object information sensed through the localization unit 840 provided in the vehicle 100.

Furthermore, in terms of the ECO aspect, the path providing device 800 may receive slope information, traffic light information, and the like related to a forward road from eHorizon, to control the vehicle so as to get efficient engine output, thereby enhancing fuel efficiency.

The infotainment system may include convenience aspect. For example, the vehicle 100 may receive from eHorizon accident information, road surface condition information, and the like related to a road ahead of the vehicle and output the received information on a display unit (for example, Head Up Display (HUD), CID, Cluster, etc.) provided in the vehicle, so as to provide guide information for the driver to drive the vehicle safely.

Referring to FIG. 10, the eHorizon (external server) may receive location information related to various types of event information (e.g., road surface condition information 1010a, construction information 1010b, accident information 1010c, etc.) occurred on roads and/or road-based speed limit information 1010d from the vehicle 100 or other vehicles

1020a and 1020b or may collect such information from infrastructures (e.g., measuring devices, sensing devices, cameras, etc.) installed on the roads.

Furthermore, the event information and the road-based speed limit information may be linked to map information or may be updated.

In addition, the location information related to the event information may be divided with respect to one or more lanes of a road.

By using such information, the eHorizon (external server) can provide information necessary for the autonomous driving system and the infotainment system to each vehicle, based on a high-definition map capable of determining a road situation (or road information) with respect to one or more lanes of the road. For example, the eHorizon (external server) may provide a high-definition map using coordinates of road-related information (for example, event information, position information regarding the vehicle 100, etc.) based on a high-definition map.

The road-related information provided by the eHorizon may be information corresponding to a predetermined region (predetermined space) with respect to the vehicle 100.

In some implementations, the path providing device 800 may acquire position information related to another vehicle through communication with the another vehicle. Communication with the another vehicle may be performed through V2X (Vehicle to everything) communication, and data transmitted/received to/from the another vehicle through the V2X communication may be data in a format defined by a Local Dynamic Map (LDM) standard.

The LDM denotes a conceptual data storage located in a vehicle control unit (or ITS station) including information related to a safe and normal operation of an application (or application program) provided in a vehicle (or an intelligent transport system (ITS)). The LDM may, for example, comply with EN standards.

The LDM differs from the foregoing ADAS MAP in the data format and transmission method. For an example, the ADAS MAP may correspond to a high-definition map having absolute coordinates received from eHorizon (external server), and the LDM may denote a high-definition map having relative coordinates based on data transmitted and received through V2X communication.

The LDM data (or LDM information) denotes data mutually transmitted and received through V2X communication (vehicle to everything) (e.g., V2V (Vehicle to Vehicle) communication, V2I (Vehicle to Infra) communication, or V2P (Vehicle to Pedestrian) communication).

The LDM may be implemented, for example, by a storage for storing data transmitted and received through V2X communication, and the LDM may be formed (stored) in a vehicle control device provided in each vehicle.

The LDM data (or LDM information) denotes data mutually transmitted and received through V2X communication (vehicle to everything) (e.g., V2V (Vehicle to Vehicle) communication, V2I (Vehicle to Infra) communication, or V2P (Vehicle to Pedestrian) communication). The LDM data may include a Basic Safety Message (BSM), a Cooperative Awareness Message (CAM), and a Decentralized Environmental Notification message (DENM), and the like, for example. For example, the LDM data may refer to a V2X message or an LDM message.

The vehicle control device may efficiently manage LDM data (or V2X messages) transmitted and received between vehicles using the LDM.

Based on LDM data received via V2X communication, the LDM may store, distribute to another vehicle, and continuously update all relevant information (e.g., a location, a speed, a traffic light status, weather information, a road surface condition, and the like of the vehicle (another vehicle)) related to a traffic situation around a place where the vehicle is currently located (or a road situation for an area within a predetermined distance from a place where the vehicle is currently located).

For example, a V2X application provided in the path providing device 800 registers in the LDM, and receives a specific message such as all the DENMs in addition to a warning about a failed vehicle. Then, the LDM may automatically assign the received information to the V2X application, and the V2X application may control the vehicle based on the information assigned from the LDM.

As described above, the vehicle 100 may be controlled by using the LDM formed by the LDM data collected through V2X communication.

The LDM may provide road-related information to the vehicle control device. The road-related information provided by the LDM provides only a relative distance and a relative speed with respect to another vehicle (or an event generation point), other than map information having absolute coordinates. For example, the vehicle 100 may perform autonomous driving using an ADAS MAP (absolute coordinates HD map) according to the ADASIS standard provided by eHorizon, but the map may be used only to determine a road condition in a surrounding area of the vehicle.

In addition, the vehicle 100 may perform autonomous driving using an LDM (relative coordinates HD map) formed by LDM data received through V2X communication, but there is a limitation in that accuracy is inferior due to insufficient absolute position information.

The path providing device 800 included in the vehicle 100 may generate a fused definition map using the ADAS MAP received from the eHorizon and the LDM data received through the V2X communication, and control (autonomously drive) the vehicle in an optimized manner using the fused definition map.

Figure 11A:
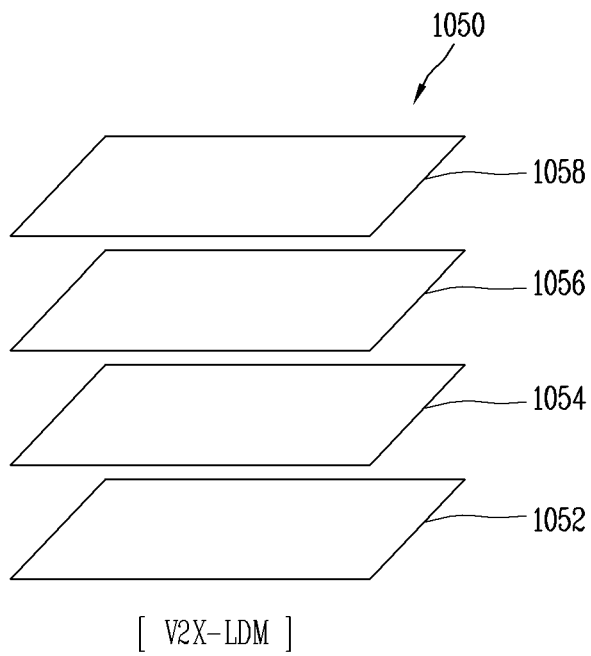
FIGS. 11A and 11B are diagrams illustrating examples of a Local Dynamic Map (LDM) and an Advanced Driver Assistance System (ADAS) MAP.
Figure 11B:
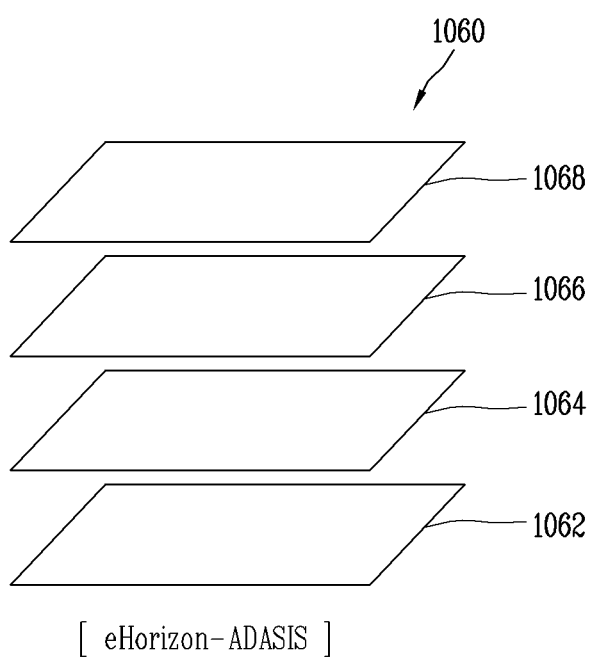

FIG. 11A illustrates an example of a data format of LDM data (or LDM) transmitted and received between vehicles via V2X communication, and FIG. 11B illustrates an example of a data format of an ADAS MAP received from an external server (eHorizon).

Referring to FIG. 11A, the LDM data (or LDM) 1050 may be formed to have four layers of data.

The LDM data 1050 may include a first layer 1052, a second layer 1054, a third layer 1056 and a fourth layer 1058.

The first layer 1052 may include static information, for example, map information, among road-related information.

The second layer 1054 may include landmark information (e.g., specific place information specified by a maker among a plurality of place information included in the map information) among information associated with roads. The landmark information may include location information, name information, size information, and the like.

The third layer 1056 may include traffic situation related information (e.g., traffic light information, construction information, accident information, etc.) among information associated with roads. The construction information and the accident information may include position information.

The fourth layer 1058 may include dynamic information (e.g., object information, pedestrian information, other vehicle information, etc.) among the road-related information. The object information, pedestrian information, and other vehicle information may include location information.

For example, the LDM data 1050 may include information sensed through a sensing unit of another vehicle or information sensed through a sensing unit of the vehicle of the present disclosure, and may include road-related information that is transformed in real time as it goes from the first layer to the fourth layer.

Referring to FIG. 11B, the ADAS MAP may be formed to have four layers of data similar to the LDM data.

The ADAS MAP 1060 may denote data received from eHorizon and formed to conform to the ADASIS specification.

The ADAS MAP 1060 may include a first layer 1062, a second layer 1064, a third layer 1066, and a fourth layer 1068.

The first layer 1062 may include topology information. The topology information, for example, is information that explicitly defines a spatial relationship, and may indicate map information.

The second layer 1064 may include landmark information (e.g., specific place information specified by a maker among a plurality of place information included in the map information) among information associated with the road. The landmark information may include position information, name information, size information, and the like.

The third layer 1066 may include high-definition map information. The high-definition map information may be referred to as an HD-MAP, and road-related information (e.g., traffic light information, construction information, accident information) may be recorded in the lane unit. The construction information and the accident information may include location information.

The fourth layer 1068 may include dynamic information (e.g., object information, pedestrian information, other vehicle information, etc.). The object information, pedestrian information, and other vehicle information may include location information.

For example, the ADAS MAP 1060 may include road-related information that is transformed in real time as it goes from the first layer to the fourth layer, similarly to the LDM data 1050.

The processor 830 may autonomously drive the vehicle 100. For example, the processor 830 may autonomously drive the vehicle 100 based on vehicle driving information sensed through various electric components provided in the vehicle 100 and information received through the TCU 810.

More specifically, the processor 830 may control the TCU 810 to acquire the position information of the vehicle. For example, the processor 830 may acquire the position information (location coordinates) of the vehicle 100 through the location information unit 420 of the TCU 810.

Furthermore, the processor 830 may control the first communication module 812 of the TCU 810 to receive map information from an external server. Here, the first communication module 812 may receive ADAS MAP from the external server (eHorizon). The map information may be included in the ADAS MAP.

In addition, the processor 830 may control the second communication module 814 of the TCU 810 to receive position information of another vehicle from the another vehicle. Here, the second communication module 814 may receive LDM data from the another vehicle. The position information of the another vehicle may be included in the LDM data.

The another vehicle denotes a vehicle existing within a predetermined distance from the vehicle 100, and the predetermined distance may be a communication-available distance of the TCU 810 or a distance set by a user.

The processor 830 may control the communication unit to receive the map information from the external server and the position information of the another vehicle from the another vehicle.

Furthermore, the processor 830 may fuse the acquired position information of the vehicle and the received position information of the another vehicle into the received map information, and control the vehicle 100 based on at least one of the fused map information or vehicle-related information sensed through the sensing unit 120.

Here, the map information received from the external server may denote highly detailed map information (HD-MAP) included in the ADAS MAP. The HD map information may be recorded with road-related information with respect to one or more lanes of a road.

The processor 830 may fuse the position information of the vehicle 100 and the position information of the another vehicle into the map information with respect to one or more lanes of a road. In addition, the processor 830 may fuse the road-related information received from the external server and the road-related information received from the another vehicle into the map information with respect to one or more lanes of a road.

The processor 830 may generate ADAS MAP required for the control of the vehicle using the ADAS MAP received from the external server and the vehicle-related information received through the sensing unit 120. More specifically, the processor 830 may apply the vehicle-related information sensed within a predetermined range through the sensing unit 120 to the map information received from the external server. Here, the predetermined range may be an available distance which can be sensed by an electric component provided in the vehicle 100 or may be a distance set by a user.

The processor 830 may control the vehicle by applying the vehicle-related information sensed within the predetermined range through the sensing unit to the map information and then additionally fusing the location information of the another vehicle thereto. For example, when the vehicle-related information sensed within the predetermined range through the sensing unit is applied to the map information, the processor 830 may only use the information within the predetermined range from the vehicle, and thus a range capable of controlling the vehicle may be local.

However, the position information of the another vehicle received through the V2X module may be received from the another vehicle located out of the predetermined range. It may be because the communication-available distance of the V2X module communicating with the another vehicle through the V2X module is farther than a predetermined range of the sensing unit 120.

As a result, the processor 830 may fuse the location information of the another vehicle included in the LDM data received through the second communication module 814 into the map information on which the vehicle-related information has been sensed, so as to acquire the location information of the another vehicle located in a broader range and more effectively control the vehicle using the acquired information. For example, it is assumed that a plurality of other vehicles is crowded ahead in a lane in which the vehicle 100 travels, and it is also assumed that the sensing unit can sense only location information related to the immediately preceding vehicle. In this case, when only vehicle-related information sensed within a predetermined range on map information is used, the processor 830 may generate a control command to control the vehicle such that the vehicle overtakes the preceding vehicle.

However, a plurality of other vehicles may be actually present ahead, which may make the vehicle difficult to overtake the other vehicles. At this time, the vehicle 100 may acquire the location information of another vehicle received through the V2X module. Here, the received location information of the another vehicle may include location information related to not only the vehicle immediately in front of the vehicle 100 (or the preceding vehicle) but also a plurality of other vehicles in front of the preceding vehicle.

The processor 830 may additionally fuse the location information related to the plurality of other vehicles acquired through the V2X module into map information to which the vehicle-related information is applied, so as to determine a situation where it is inappropriate to overtake the preceding vehicle.

With such configuration, the vehicle 100 can overcome the technical limitation associated with conventional systems that only vehicle-related information acquired through the sensing unit 120 is merely fused to high-definition map information and thus autonomous driving is enabled only within a predetermined range. For example, vehicle 100 can achieve more accurate and stable vehicle control by additionally fusing information related to other vehicles (e.g., speeds, locations of other vehicles), which have been received from the other vehicles located at a farther distance than the predetermined range through the V2X module, as well as vehicle-related information sensed through the sensing unit, into map information.

Vehicle control described herein may include at least one of autonomously driving the vehicle 100 or outputting a warning message associated with the driving of the vehicle.

Hereinafter, description will be given in more detail of a method in which a processor controls a vehicle using LDM data received through a V2X module, ADAS MAP received from an external server (eHorizon), and vehicle-related information sensed through a sensing unit provided in the vehicle, with reference to the accompanying drawings.

Figure 12A:
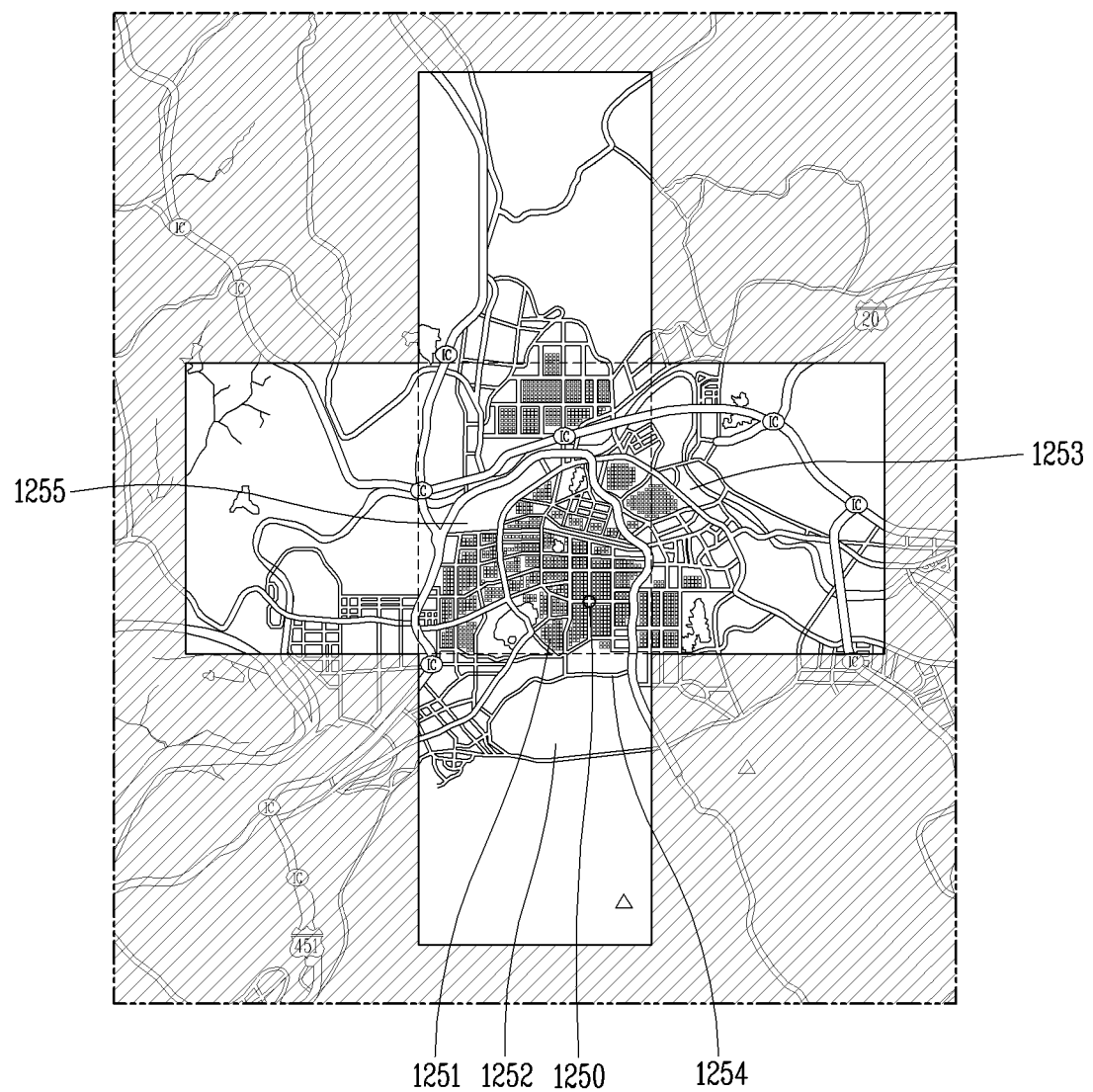
FIGS. 12A and 12B are diagrams illustrating examples of method of receiving high-definition map data by a path providing device of FIG. 8.
Figure 12B:
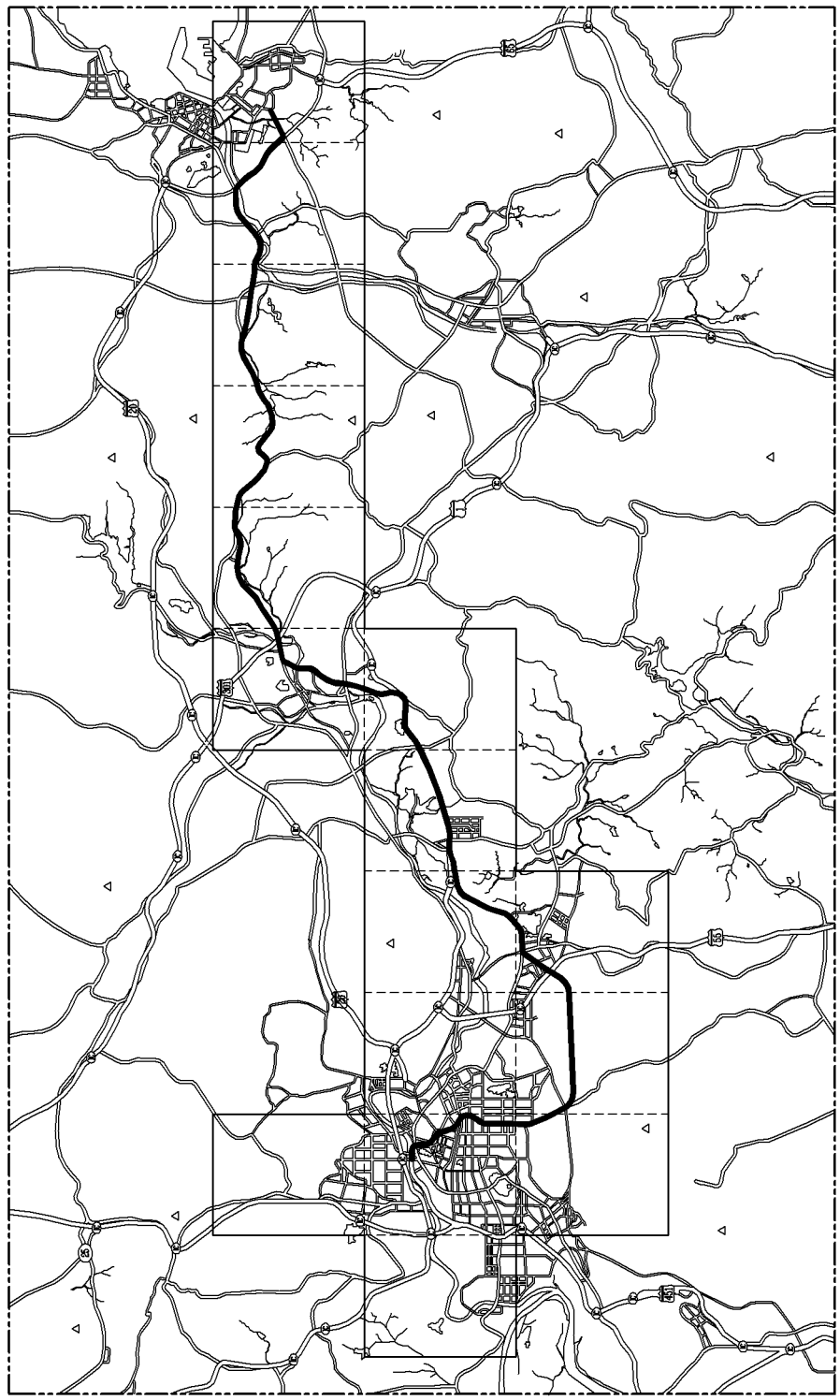

FIGS. 12A and 12B are exemplary views illustrating a method in which a communication device receives high-definition map data.

The server may divide HD map data into tile units and provide them to the path providing device 800. The processor 830 may receive HD map data in the tile units from the server or another vehicle through the TCU 810. Hereinafter, HD map data received in tile units is referred to as 'HD map tile'.

The HD map data is divided into tiles having a predetermined shape, and each tile corresponds to a different portion of the map. By connecting all the tiles, the full HD map data may be acquired. Since the HD map data has a high capacity, the vehicle 100 may be provided with a high-capacity memory in order to download and use the full HD map data. As communication technologies are developed, it is more efficient to download, use, and delete HD map data in tile units, rather than to provide the high-capacity memory in the vehicle 100.

For the convenience of description, a case in which the predetermined shape is rectangular is described as an example, but the predetermined shape may be modified to various polygonal shapes.

The processor 830 may store the downloaded HD map tiles in the memory 140. In addition, when a storage unit (or cache memory) is provided in the path providing device, the processor 830 may store (or temporarily store) the downloaded HD map tile in the storage unit provided in the path providing device.

The processor 830 may delete the stored HD map tile. For example, the processor 830 may delete the HD map tile when the vehicle 100 leaves an area corresponding to the HD map tile. By way of further example, the processor 830 may delete the HD map tile when a preset time elapses after storage.

As illustrated in FIG. 12A, when there is no preset destination, the processor 830 may receive a first HD map tile 1251 including a location (position) 1250 of the vehicle 100. The server receives data of the location 1250 of the vehicle 100 from the vehicle 100, and transmits the first HD map tile 1251 including the location 1250 of the vehicle 100 to the vehicle 100. In addition, the processor 830 may receive HD map tiles 1252, 1253, 1254, and 1255 around the first HD map tile 1251. For example, the processor 830 may receive the HD map tiles 1252, 1253, 1254, and 1255 that are adjacent to top, bottom, left, and right sides of the first HD map tile 1251, respectively. In this case, the processor 830 may receive a total of five HD map tiles. For example, the processor 830 may further receive HD map tiles located in a diagonal direction, together with the HD map tiles 1252, 1253, 1254, and 1255 adjacent to the top, bottom, left, and right sides of the first HD map tile 1251. In this case, the processor 830 may receive a total of nine HD map tiles.

As illustrated in FIG. 12B, when there is a preset destination, the processor 830 may receive tiles associated with a path from the location 1250 of the vehicle 100 to the destination. The processor 830 may receive a plurality of tiles to cover the path.

In some implementations, the processor 830 may receive all the tiles covering the path at one time.

Alternatively, the processor 830 may receive the entire tiles in a dividing manner while the vehicle 100 travels along the path. For example, the processor 830 may receive only some of the entire tiles based on the location of the vehicle 100 while the vehicle 100 travels along the path. Thereafter, the processor 830 may continuously receive tiles during the travel of the vehicle 100 and delete the previously received tiles.

The processor 830 may generate electronic horizon data based on the HD map data.

The vehicle 100 may travel in a state where a final destination is set. The final destination may be set based on a user input received via the user interface apparatus 200 or the communication apparatus 400. According to some implementations, the final destination may be set by the driving system 710.

In the state where the final destination is set, the vehicle 100 may be located within a preset distance from a first point during driving. When the vehicle 100 is located within the preset distance from the first point, the processor 830 may generate electronic horizon data having the first point as a start point and a second point as an end point. The first point and the second point may be points on the path heading to the final destination. The first point may be described as a point where the vehicle 100 is located or will be located in the near future. The second point may be described as the horizon described above.

The processor 830 may receive an HD map of an area including a section from the first point to the second point. For example, the processor 830 may request an HD map for an area within a predetermined radial distance from the section between the first point and the second point and receive the requested HD map.

The processor 830 may generate electronic horizon data for the area including the section from the first point to the second point, based on the HD map. The processor 830 may generate horizon map data for the area including the section from the first point to the second point. The processor 830 may generate horizon path data for the area including the section from the first point to the second point. The processor 830 may generate a main path for the area including the section from the first point to the second point. The processor 830 may generate data of a sub path for the area including the section from the first point to the second point.

When the vehicle 100 is located within a preset distance from the second point, the processor 830 may generate electronic horizon data having the second point as a start point and a third point as an end point. The second point and the third point may be points on the path heading to the final destination. The second point may be described as a point where the vehicle 100 is located or will be located in the near future. The third point may be described as the horizon described above. In some implementations, the electronic horizon data having the second point as the start point and the third point as the end point may be geographically connected to the electronic horizon data having the first point as the start point and the second point as the end point.

The operation of generating the electronic horizon data using the second point as the start point and the third point as the end point may be performed by correspondingly applying the operation of generating the electronic horizon data having the first point as the start point and the second point as the end point.

According to some implementations, the vehicle 100 may travel even when the final destination is not set.

Figure 13:
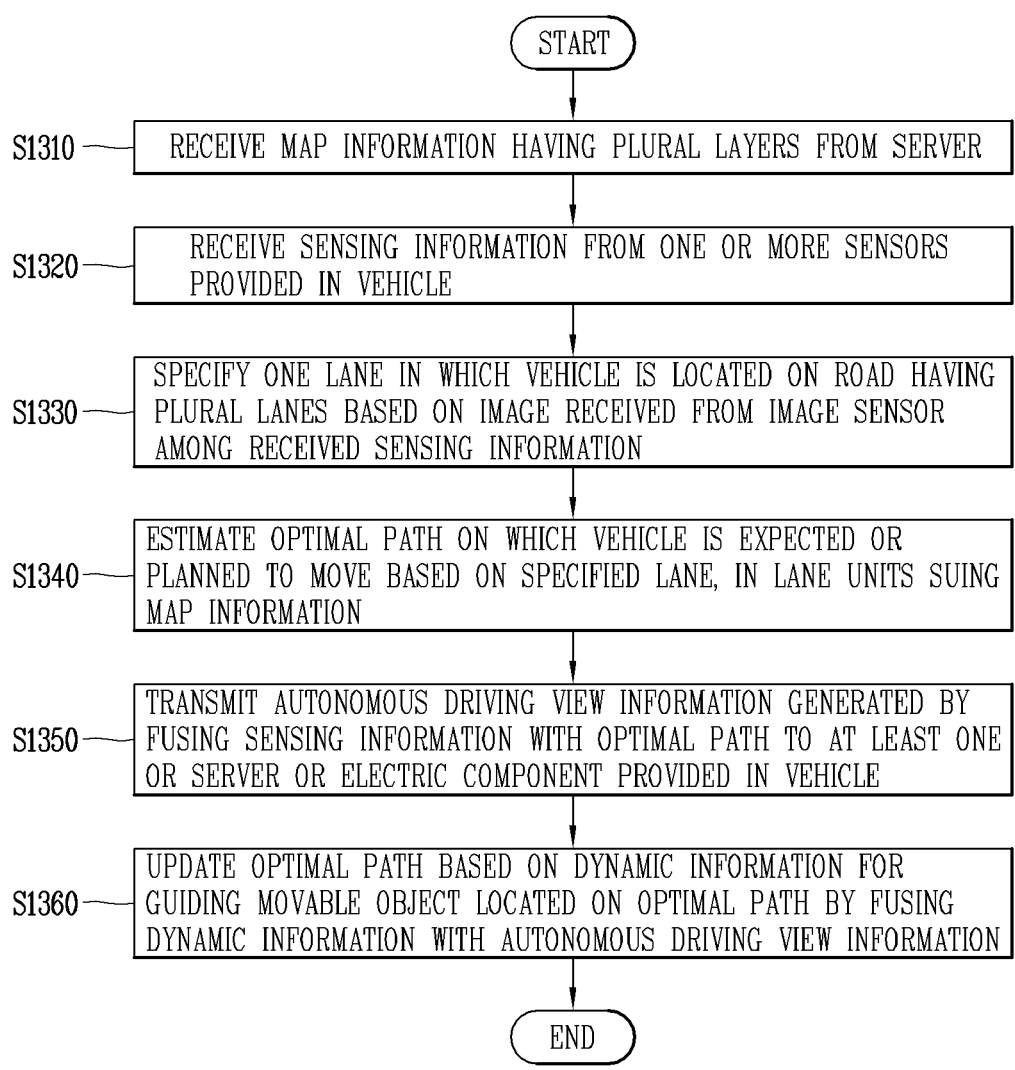
FIG. 13 is a flowchart of an exemplary method of generating autonomous driving visibility information by receiving high-definition map by the path providing device.

FIG. 13 is a flowchart of an exemplary path providing method of the path providing device of FIG. 9.

The processor 830 may receive a high-definition map from an external server. Specifically, the processor 830 may receive map information (HD map, high-definition map) including a plurality of layers of data from a server (external server, cloud server) (S1310).

The external server is an example of the telematics communication device 910 as a device capable of communicating through the first communication module 812. The high-definition map is composed of a plurality of layers of data. Furthermore, the high-definition map may include at least one of the four layers described above with respect to FIG. 11B as an ADAS MAP.

The map information may include horizon map data described above. The horizon map data may refer to an ADAS MAP (or LDM MAP) or HD MAP data including a plurality of layers of data while satisfying the ADASIS standard described with respect to FIG. 11B.

In addition, the processor 830 of the path providing device 800 may receive sensing information from one or more sensors provided in the vehicle (S1320). The sensing information may refer to information sensed by each sensor (or information processed after being sensed). The sensing information may include various information according to the types of data that can be sensed by the sensor.

The processor 830 may identify any one lane in which the vehicle 100 is located on a road composed of a plurality of lanes, based on an image (or video) received from an image sensor among sensing information (S1330). Here, the lane may refer to a lane in which the vehicle 100 currently equipped with the path providing device 800 is driving.

The processor 830 may determine a lane in which the vehicle 100 equipped with the path providing device 800 is driving by using (analyzing) an image (or video) received from an image sensor (or camera) among the sensors.

In addition, the processor 830 may estimate an optimal path that is expected or planned to move the vehicle 100 based on the identified lane in units of lanes using map information (S1340). Here, the optimal path may refer to the foregoing horizon path data or main path described above. However, the present disclosure is not limited thereto, and the optimal path may further include a sub path. Here, the optimal path may be referred to as a Most Preferred Path or Most Probable Path, and may be abbreviated as MPP.

For example, the processor 830 may predict or plan an optimal path in which the vehicle 100 can travel to a destination based on a specific lane in which the vehicle 100 is driving, using map information.

The processor 830 may generate autonomous driving visibility information in which sensing information is fused with the optimal path to transmit it to at least one of electrical parts provided in a server or a vehicle (S1350).

Here, the autonomous driving visibility information may refer to electronic horizon information (or electronic horizon data) described above. The autonomous driving visibility information (or data, environment) used by the vehicle 100 to perform autonomous driving in units of lanes, may denote environmental data for autonomous driving in which all information (map information, vehicles, objects, moving objects, environment, weather, etc.) within a predetermined range are merged based on a road or an optimal path including a path in which the vehicle 100 moves, as illustrated in FIG. 10. The autonomous driving environment data may refer to data (or overall data environment) based on which the processor 830 of the vehicle 100 autonomously drives the vehicle 100 or calculates an optimal path of the vehicle 100.

In some implementations, the other hand, the autonomous driving visibility information may denote information for guiding a driving path in units of lanes. This is information in which at least one of sensing information or dynamic information is merged into an optimal path, and finally, may be information for guiding a driving path in units of lanes.

When autonomous driving visibility information refers to information for guiding a driving path in units of lanes, the processor 830 may generate different autonomous driving visibility information according to whether a destination is set in the vehicle 100.

For example, when the destination is set in the vehicle 100, the processor 830 may generate autonomous driving visibility information for guiding a driving path (travel path) to the destination in units of lanes.

By way of further example, when no destination is set in the vehicle 100, the processor 830 may calculate a main path (most preferred path, MPP) having the highest possibility that the vehicle 100 may drive, and generate autonomous driving visibility information for guiding the main path (MPP) in units of lanes. In this case, the autonomous driving visibility information may further include sub path information on sub paths branched from the most preferred path (MPP) for the vehicle 100 to be movable at a higher probability than a predetermined reference.

The autonomous driving visibility information may provide a driving path to the destination for each lane indicated on a road, thereby providing more precise and detailed path information. The autonomous driving visibility information may be path information conforming to the standard of ADASIS v3.

The processor 830 may merge dynamic information for guiding a movable object located on an optimal path with the autonomous driving visibility information, and update the optimal path based on the dynamic information (S1360). The dynamic information may be included in map information received from a server, and may be information included in any one (e.g., a fourth layer 1068) of a plurality of layers of data.

The foregoing description will be summarized as follows.

The processor 830 may generate autonomous driving visibility information for guiding a road located in the front of the vehicle in units of lanes using the high-definition map.

The processor 830 may receive sensing information from one or more sensors provided in the vehicle 100 through the interface unit 820. The sensing information may be vehicle driving information.

The processor 830 may identify any one lane in which the vehicle is located on a road made up of a plurality of lanes based on an image received from an image sensor among the sensing information. For example, when the vehicle 100 is driving in a first lane on a 8-lane road, the processor 830 may identify the first lane as a lane in which the vehicle 100 is located based on the image received from the image sensor.

The processor 830 may estimate an optimal path that is expected or planned to move the vehicle 100 based on the identified lane in units of lanes using the map information.

Here, the optimal path may refer to a Most Preferred Path or Most Probable Path, and may be abbreviated as MPP.

The vehicle 100 may drives autonomously along the optimal path. When driving manually, the vehicle 100 may provide navigation information that guides the optimal path to the driver.

The processor 830 may generate autonomous driving visibility information, in which the sensing information is merged into the optimal path. The autonomous driving visibility information may be referred to as "eHorizon" or "electronic horizon" or "electronic horizon data" or an "ADASIS message" or a "field-of-view information tree graph."

The processor 830 may use the autonomous driving visibility information differently depending on whether a destination has been set in the vehicle 100.

For example, when the destination is set in the vehicle 100, the processor 830 may generate an optimal path for guiding a driving path to the destination in units of lanes using the autonomous driving visibility information.

By way of further example, when a destination has not been set in the vehicle 100, the processor 830 may calculate a main path in which the vehicle 100 is most likely to drive in units of lanes using the autonomous driving visibility information. In this case, the autonomous driving visibility information may further include sub path information on sub paths branched from the most preferred path (MPP) for the vehicle 100 to be movable at a higher probability than a predetermined reference.

The autonomous driving visibility information may provide a driving path to the destination for each lane indicated on a road, thereby providing more precise and detailed path information. The path information may be path information conforming to the standard of ADASIS v3.

The autonomous driving visibility information may be provided by subdividing a path in which the vehicle must drive or a path in which the vehicle can drive in units of lanes. The autonomous driving visibility information may include information for guiding a driving path to a destination in units of lanes. When the autonomous driving visibility information is displayed on a display mounted on the vehicle 100, guide lines for guiding lanes that can be driven on a map and information within a predetermined range (e.g., roads, landmarks, other vehicles, surrounding objects, weather information, etc.) based on the vehicle may be displayed.

Moreover, a graphic object indicating the location of the vehicle 100 may be included in at least one lane on which the vehicle 100 is located among a plurality of lanes included in the map.

The autonomous driving visibility information may be fused with dynamic information for guiding a movable object located on the optimal path. The dynamic information may be received by the processor 830 through the communication unit 810 and/or the interface unit 820, and the processor 830 may update the optimal path based on the dynamic information. As the optimal path is updated, the autonomous driving visibility information is also updated.

The dynamic information may include dynamic data.

The processor 830 may provide the autonomous driving visibility information to at least one electric component provided in the vehicle. Moreover, the processor 830 may provide the autonomous driving visibility information to various applications installed in the system of the vehicle 100.

The electric component refers to any device mounted on the vehicle 100 and capable of performing communication, and may include the components described above with reference to FIGS. 1 through 9 (e.g., the components 120-700 described above with reference to FIG. 7). For example, an object detecting apparatus 300 such as a radar and a lidar, a navigation system 770, a vehicle operating apparatus 600, and the like may be included in the electric components.

In addition, the electric component may further include an application executable in the processor 830 or a module that executes the application.

The electric component may perform its own function to be carried out based on the autonomous driving visibility information.

The autonomous driving visibility information may include a path in units of lanes and a location of the vehicle 100, and may include dynamic information including at least one object that must be sensed by the electric component. The electric component may reallocate a resource to sense an object corresponding to the dynamic information, determine whether the dynamic information matches sensing information sensed by itself, or change a setting value for generating sensing information.

The autonomous driving visibility information may include a plurality of layers, and the processor 830 may selectively transmit at least one of the layers according to an electric component that receives the autonomous driving visibility information.

Specifically, the processor 830 may select at least one of a plurality of layers included in the autonomous driving visibility information, based on at least one of a function being executed by the electrical component or a function scheduled to be executed. In addition, the processor 830 may transmit the selected layer to the electronic component, but the unselected layer may not be transmitted to the electrical component.

The processor 830 may receive external information generated by an external device from the external device located within a predetermined range with respect to the vehicle.

The predetermined range is a distance at which the second communication module 814 can perform communication, and may vary according to the performance of the second communication module 814. When the second communication module 814 performs V2X communication, a V2X communication range may be defined as the predetermined range.

Moreover, the predetermined range may vary according to an absolute speed of the vehicle 100 and/or a relative speed with respect to the external device.

The processor 830 may determine the predetermined range based on the absolute speed of the vehicle 100 and/or the relative speed with respect to the external device, and allow communication with an external device located within the determined predetermined range.

Specifically, external devices capable of communicating through the second communication module 814 may be classified into a first group or a second group based on the absolute speed of the vehicle 100 and/or the relative speed with respect to the external device. External information received from an external device included in the first group is used to generate dynamic information described below, but external information received from an external device included in the second group is not used to generate the dynamic information. Even when external information is received from an external device included in the second group, the processor 830 may ignore the external information.

The processor 830 may generate dynamic information of an object that must be sensed by at least one electrical part provided in the vehicle based on the external information, and may match the dynamic information to the field-of-view information for autonomous driving.

For example, the dynamic information may correspond to the fourth layer described above with reference to FIGS. 11A and 11B.

As described above with respect to FIGS. 11A and 11B, the path providing device 800 may receive the ADAS MAP and/or the LDM data. Specifically, the path providing device 800 may receive the ADAS MAP from the telematics communication device 910 through the first communication module 812, and the LDM data from the V2X communication device 930 through the second communication module 814.

The ADAS MAP and the LDM data may be composed of a plurality of layers of data each having the same format. The processor 830 may select at least one layer from the ADAS MAP, select at least one layer from the LDM data, and generate the autonomous driving visibility information including the selected layers.

For example, the processor 830 may select the first to third layers of the ADAS MAP, select the fourth layer of the LDM data, and generate one autonomous driving visibility information by aligning those four layers into one. In this case, the processor 830 may transmit a reject message for rejecting the transmission of the fourth layer to the telematics communication device 910. This is because receiving partial information excluding the fourth layer uses less resources of the first communication module 812 than receiving all information including the fourth layer. By matching part of the ADAS MAP with part of the LDM data, complementary information can be utilized.

In some implementations, the processor 830 may select the first to fourth layers of the ADAS MAP, select the fourth layer of the LDM data, and generate one autonomous driving visibility information may be generated by aligning those five layers into one. In this case, priority may be given to the fourth layer of the LDM data. When there is discrepancy information that does not match the fourth layer of the LDM data in the fourth layer of the ADAS MAP, the processor 830 may delete the discrepancy information or correct the discrepancy information based on the LDM data.

The dynamic information may be object information for guiding a predetermined object. For example, at least one of a location coordinate for guiding the location of the predetermined object, and information for guiding the shape, size, and type of the predetermined object may be included in the dynamic information.

The predetermined object may denote an object that obstructs driving in the corresponding lane among objects that can drive on a road.

For example, the predetermined object may include a bus stopping at a bus stop, a taxi stopping at a taxi stop, a truck dropping a courier, and the like.

By way of further example, the predetermined object may include a garbage collection vehicle driving at a constant speed or below, or a large vehicle (e.g., truck or container truck, etc.) determined to obstruct view.

As another example, the predetermined object may include an object indicating an accident, road damage, or construction.

As described above, the predetermined object may include all types of objects disallowing the driving of the present vehicle 100 or obstructing the lane not to allow the vehicle 100 to drive. Traffic signals such as ice roads, pedestrians, other vehicles, construction signs, and traffic lights to be avoided by the vehicle 100 may correspond to the predetermined object and may be received by the path providing device 800 as the external information.

Meanwhile, the processor 830 may determine whether a predetermined object guided by the external information is located within a reference range based on the driving path of the vehicle 100.

Whether or not the predetermined object is located within the reference range may vary depending on the lane on which the vehicle 100 drives and the location of the predetermined object.

For example, external information for guiding a sign indicating the construction of a third lane ahead 1 km while driving on a first lane may be received. When the reference range is set to 1 m with respect to the vehicle 100, the sign is located out of the reference range. It is because when the vehicle 100 continues to drive on the first lane, the third lane is located out of 1 m with respect to the vehicle 100. On the contrary, when the reference range is set to 10 m with respect to the vehicle 100, the sign is located within the reference range.

The processor 830 may generate the dynamic information based on the external information when the predetermined object is located within the reference range, but does not generate the dynamic information when the predetermined object is located out of the reference range. In other words, the dynamic information may be generated only when the predetermined object guided by the external information is located on a driving path of the vehicle 100 or within a reference range capable of affecting the driving path of the vehicle 100.

Since the path providing device combines information received through the first communication module and information received through the second communication module into one, which may result in generating and providing optimal autonomous driving visibility information capable of complementing different types of information provided through such different communication modules. This is because information received through the first communication module cannot reflect information in real time but such limitation can be complemented by information received through the second communication module.

Further, since when there is information received through the second communication module, the processor 830 controls the first communication module so as not to receive the corresponding information, it may be possible to use the bandwidth of the first telecommunication control unit less than the related art. In other words, the resource use of the first telecommunication control unit may be minimized.

Hereinafter, a path providing device which can include at least one of those components described above, and a method of controlling the same will be described in more detail with reference to the accompanying drawings.

Figure 14A:
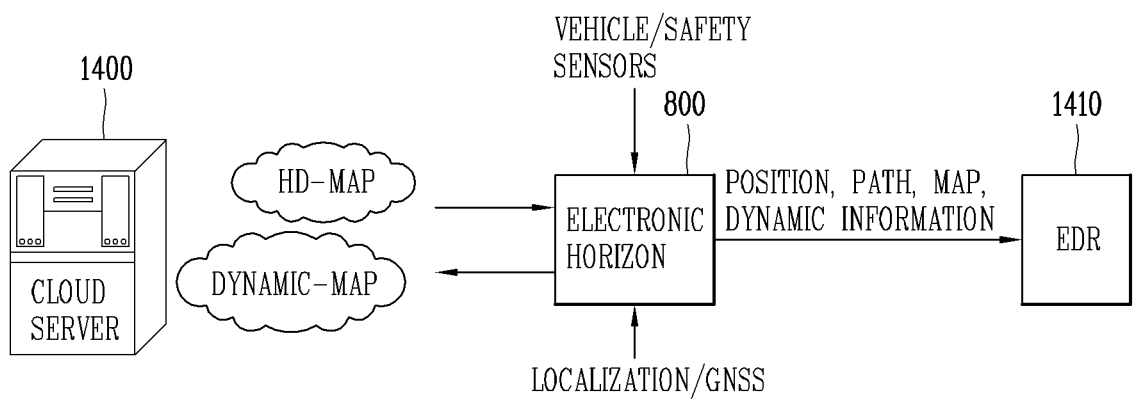
FIGS. 14A and 14B are conceptual views of an exemplary Event Data Recorder (EDR).
Figure 14B:
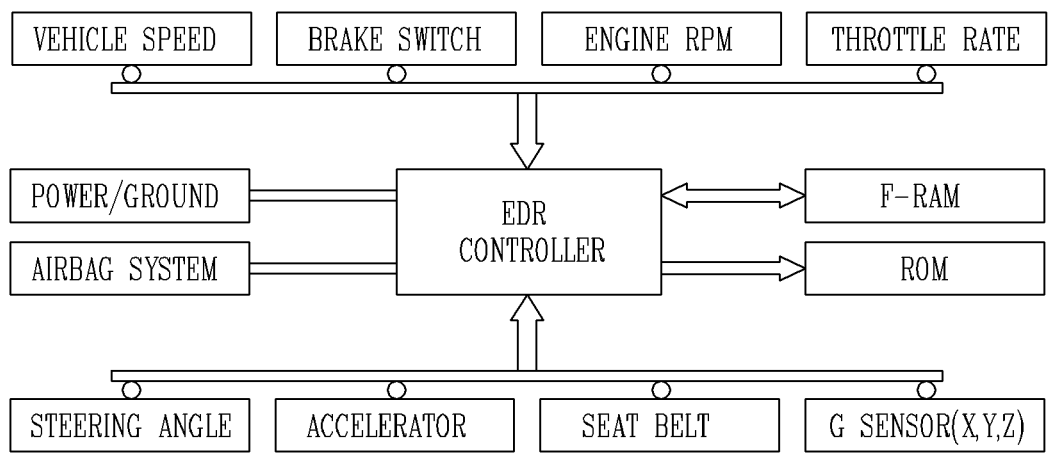

FIGS. 14A and 14B are conceptual views of an exemplary Event Data Recorder (EDR).

Referring to FIG. 14A, a path providing device may further include an Event Data Recorder (EDR) 1410 configured to store vehicle status information, which includes sensor data that is sensed by a first sensor related to an operation of the vehicle, and sensor data that is sensed by a second sensor related to surrounding information of the vehicle.

The first sensor may refer to one of a plurality of sensors included in the sensing unit 120 described above, and may be, for example, a vehicle sensor (V. Sensor) described in FIG. 8. The first sensor, for example, may include a sensor for detecting a steering direction of the vehicle, a throttle sensor, a brake sensor, a steering wheel sensor, and the like.

The second sensor may refer to one of the plurality of sensors included in the sensing unit 120 described above, and may be, for example, a safety sensor (S. Sensor) as described in FIG. 8. The second sensor, for example, may include a camera, a radar, a LiDAR, a sonar sensor, and the like.

The EDR 1410 may be included (mounted) in the path providing device 800 and may be configured as one of parts constructing the path providing device 800.

In addition, the EDR 1410 may also be provided in the vehicle to transmit and receive data to and from the path providing device 800 although it is not included in the path providing device 800 (i.e., it is independent of the path providing device 800).

Various implementations of the EDR 1410 will be described in more detail with reference to FIG. 15.

The EDR 1410 may generate and store vehicle status information including sensor data that is sensed by the first sensor in relation to the operation of the vehicle and sensor data that is sensed by the second sensor in relation to surrounding information of the vehicle.

Here, the vehicle status information is a concept including an operation state of the vehicle, a manipulation state of the vehicle, a driving state of the vehicle, and the like, and may be information that the state of the vehicle has been recorded for each position and time by a driver or the processor.

The vehicle status information may be information coded in the form of text or may be information in the form of an image or a video.

The vehicle status information may be generated and stored for each position of the vehicle 100 and time, at any time, at predetermined time intervals, according to a user request, or in response to an occurrence of a preset event.

In addition, the vehicle status information may be associated (linked) with or may include position information related to the vehicle and time information.

The path providing device 800 may receive a high-definition map (HD-map) and dynamic information (or dynamic map) from an external server 1400 (e.g., a cloud or a cloud server, or a server).

In addition, the path providing device 800 may receive sensor data sensed by the first sensor (V. Sensor) in relation to the operation of the vehicle, and receive sensor data sensed by the second sensor (S. Sensor) in relation to the surrounding information of the vehicle.

In addition, the path providing device 800 may receive localization information in which the position of the vehicle matches (is aligned on) an HD map (autonomous driving visibility information), based on position information related to the vehicle (or position information related to the path providing device) received from a GNSS system.

The path providing device 800 may transmit position information related to the vehicle, sensor data received from each of the first and second sensors, time information, and the like, to the EDR 1410.

Thereafter, the EDR 1410 may generate and store vehicle status information using the sensor data with respect to the operation of the vehicle and the surrounding information of the vehicle, sensed by the first and second sensors, and associate (link) the position information related to the vehicle and the time information with the generated vehicle status information.

The EDR 1410 may be provided in the vehicle and/or the path providing device in various implementations.

Hereinafter, various exemplarily configuration of a path providing device and an Event Data Recorder (EDR) will be described in detail with reference to the accompanying drawings.

FIGS. 15A, 15B, 15C, 15D, 15E, 15F, and 15G are conceptual views illustrating various implementations of an EDR included in a vehicle.

Figure 15A:
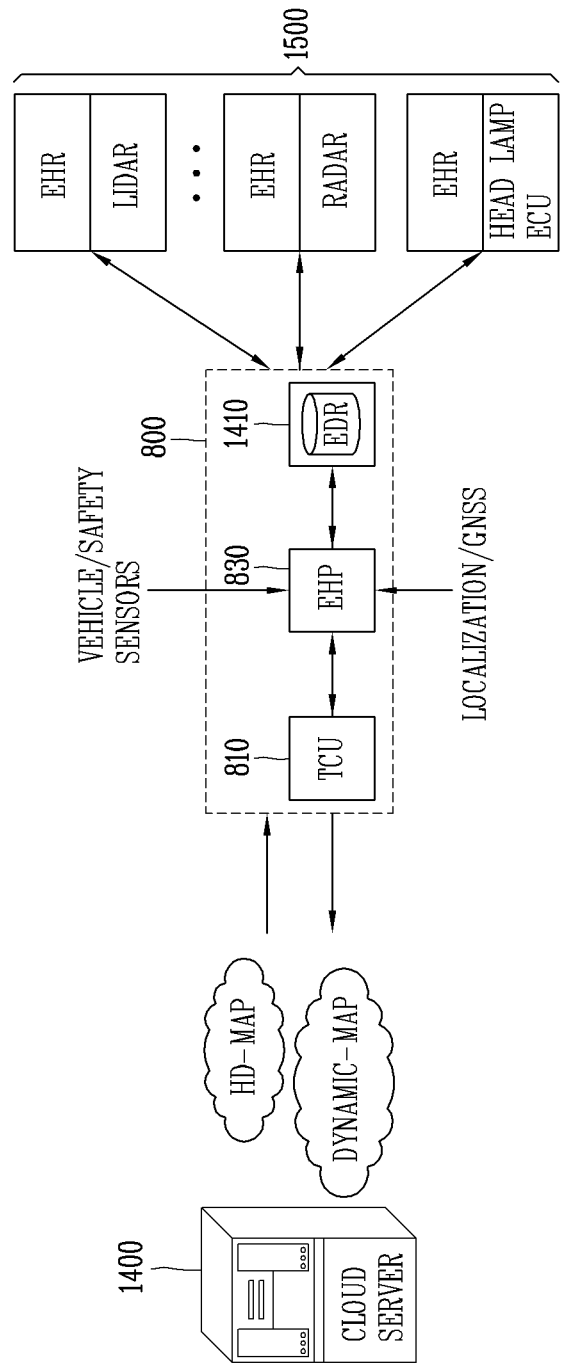
FIGS. 15A, 15B, 15C, 15D, 15E, 15F, and 15G are conceptual views of exemplary implementations of an EDR included in a vehicle.

Referring to FIG. 15A, in the path providing device 800, the processor 830, the communication unit (Telecommunication Unit (TCU)) 810, and the EDR 1410 may be provided on a printed circuit board. Data may be transmitted and received through circuits disposed on the printed circuit board.

The processor 830, the communication unit 810, and the EDR 1410 may directly perform communication with the circuits disposed on the printed circuit board. Here, directly performing communication may refer to performing communication through circuits printed (provided) on the printed circuit board.

For example, the processor 830 may transmit various data (or information) so that the EDR 1410 generates and stores the vehicle status information. At this time, the data provided to the EDR may include at least one of speed, brake information, acceleration, engine rotation speed (RPM), or steering angle, which are all related to the vehicle.

In some implementations, the data provided to the EDR 1410 may include data related to the operation of the vehicle sensed by the first sensor (e.g., data related to operations of the components provided in the vehicle, such as which direction the vehicle is facing (steering direction), whether a brake is operating, whether a steering wheel is operating, whether a lamp is turned on, etc.), and data (e.g., information related to object, road, other vehicles, etc. located in the vicinity of the vehicle) related to the surrounding information related to the vehicle sensed by the second sensor (safety sensor).

Further, the data provided to the EDR 1410 may further include current position information related to the vehicle determined through the communication unit 810, time information at the time that such data has been transmitted, and the like.

At this time, the EDR 1410 may function as a black box. Accordingly, the processor 830 may encrypt data provided to the EDR 1410 and transmit the encrypted data to the EDR 1410.

As illustrated in FIG. 15A, the path providing device 800 may include the communication unit 810, the processor 830, and the EDR 1410 all provided on one printed circuit board. Being provided on one printed circuit board may mean that the communication unit 810, the processor 830, and the EDR 1410 are all included in the path providing device 800.

The processor 830 may transmit information that is necessary to generate/update autonomous driving visibility information and/or optimal path, or the autonomous driving visibility information and/or the optimal path (such information is referred to as eHorizon data), to electric components 1500 disposed at the vehicle.

At this time, the processor 830 may transmit the eHorizon data to the electric components 1500 provided in the vehicle through the interface unit 820 in a wired communication manner.

However, the present disclosure is not limited thereto, and the processor 830 may alternatively transmit the eHorizon data to the electric components 1500 provided in the vehicle through the communication unit 810 in a wireless communication manner.

The processor 830 may receive a high-definition map and/or dynamic information (or dynamic map) from an external server 1400 through the communication unit 810.

Figure 15B:
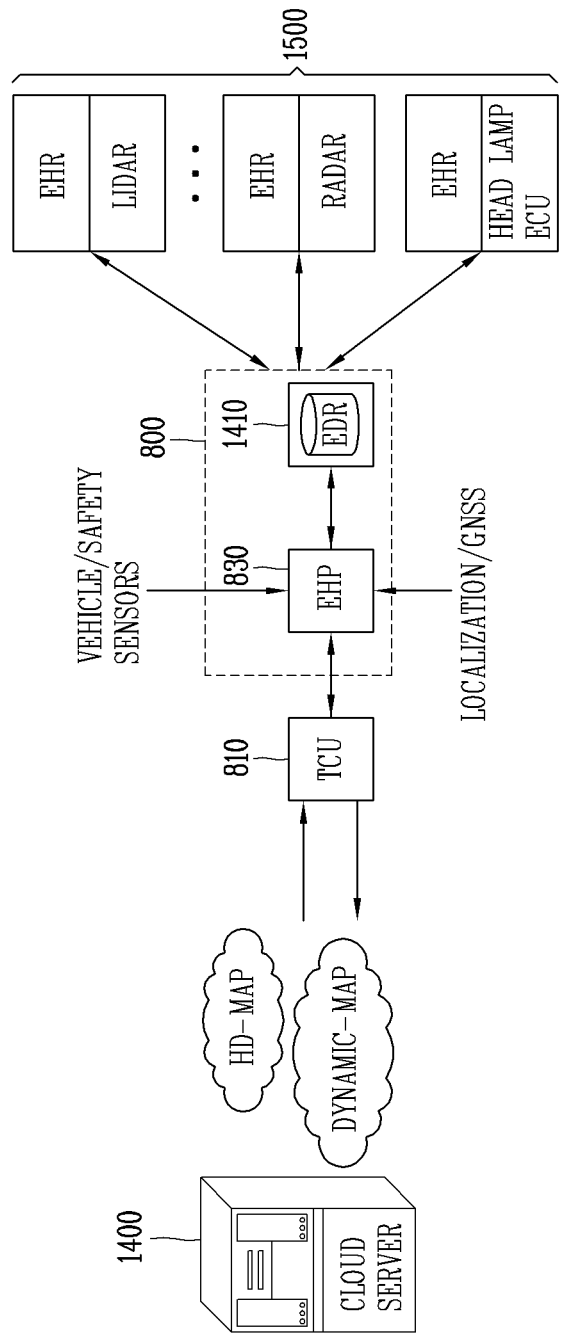

In some implementations, as illustrated in FIG. 15B, the communication unit 810 may not be provided in the path providing device 800 but be provided in the vehicle 100. In this case, the processor 830 and the communication unit 810 may be connected through the interface unit 820 in a wired manner.

The path providing device 800 may not include the aforementioned communication unit 810. The communication unit 810 (or communication module) may receive information generated (or processed) by the processor 830 included in the path providing device 800 through wired communication (e.g., Controller Area Network (CAN) communication).

The communication unit 810 may be provided in the vehicle, independent of the path providing device 800.

FIG. 15B illustrates an implementation where the communication unit 810 is not provided in the path providing device 800 and is provided in the vehicle 100. Therefore, the path providing device 800 may perform communication with the communication unit 810 provided in the vehicle. In this case, the path providing device 800 may perform communication with the communication unit 810 through wired communication (or CAN communication).

In addition, as described above, in the case of FIG. 15B, the communication unit 810 may be a communication module provided in the vehicle. When the communication module is provided in the vehicle and is not included in the path providing device, the interface unit 820 may be connected to the communication unit 810 provided in the vehicle in a wired manner. That is, the processor 830 may perform wired communication (e.g., CAN communication) with the communication unit 810 through the interface unit 820.

The processor 830 may transmit autonomous driving visibility information to the communication unit 810 connected in the wired manner. In addition, the autonomous driving visibility information may be transmitted wirelessly or wired to the electric components provided in the vehicle through the communication unit 810.

The electric components 1500 provided in the vehicle may refer to various components provided in the vehicle, and may include, for example, a sensor, a lamp, and the like. The electric components provided in the vehicle may be referred to as an eHorizon Receiver (EHR) in terms of receiving an ADASIS message including autonomous driving visibility information from the processor 830.

The processor 830 may be referred to as an eHorizon Provider (EHP) in terms of providing (transmitting) the ADASIS Message including the autonomous driving visibility information.

The ADASIS message including the autonomous driving visibility information may be a message in which the autonomous driving visibility information is converted to comply with the ADASIS standard specification.

Also, the communication unit 810 may perform the role of the interface unit 820. Accordingly, the communication unit 810 may control wired communication as well as wireless communication.

In this case, the processor 830 may transmit the autonomous driving visibility information to the communication unit 810, and the communication unit 810 may transmit the autonomous driving visibility information to the electric components 1500 provided in the vehicle through wireless or wired communication.

Figure 15C:
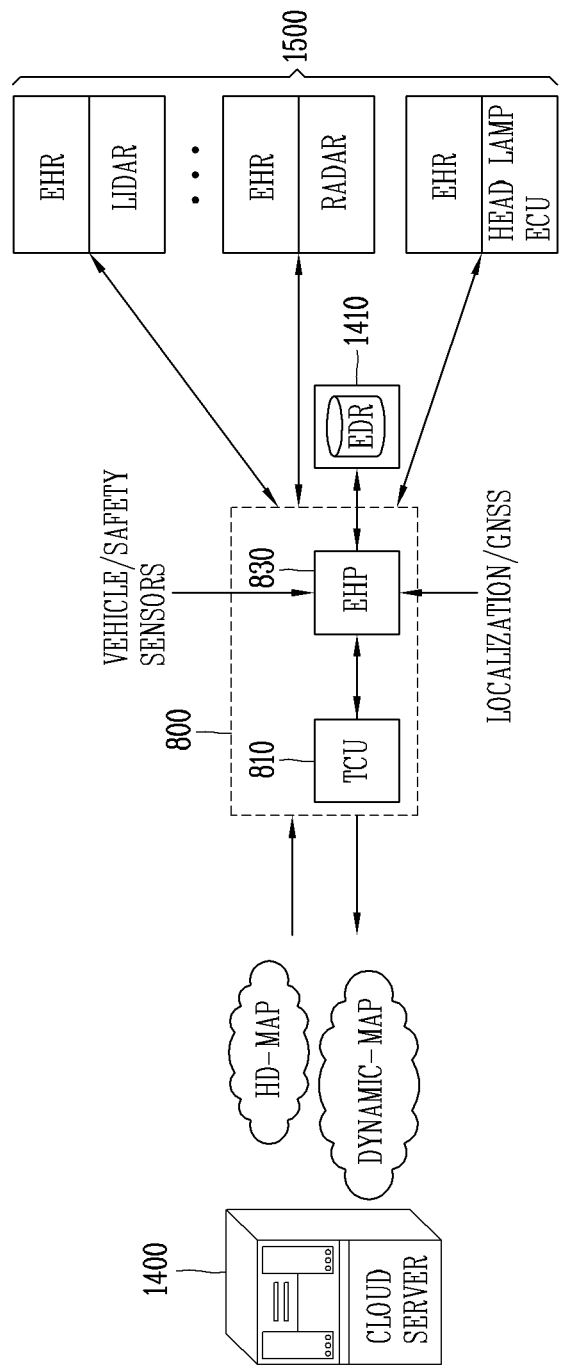

In some implementations, as illustrated in FIG. 15C, the EDR 1410 may not be provided in the path providing device 800 but may be independently provided in the vehicle 100.

In this case, the processor 830 may transmit and receive (or transmit) vehicle status information to and from the EDR through the interface unit 820 in the wired manner (or in the CAN communication manner).

As described above, the EDR has been described as generating and storing the vehicle status information, but the present disclosure is not limited thereto. For example, the processor 830 may alternatively generate vehicle status information based on sensor data sensed by the first and second sensors, and transmit the generated vehicle status information to the EDR 1410 for storage.

Even in this case, the processor 830 may transmit the autonomous driving visibility information (or the ADASIS message including it) to the electric components 1500 provided in the vehicle through the communication unit 810 in the wired or wireless manner.

In addition, the processor 830 may perform data transmission and reception with the EDR 1410 through the communication unit 810 or the interface unit 820 in the wired manner (e.g., CAN communication).

The configuration of receiving the high-definition map and the dynamic information (or dynamic map) from the external server 1400 through the communication unit 810 may be applied equally/similarly in this specification.

Figure 15D:
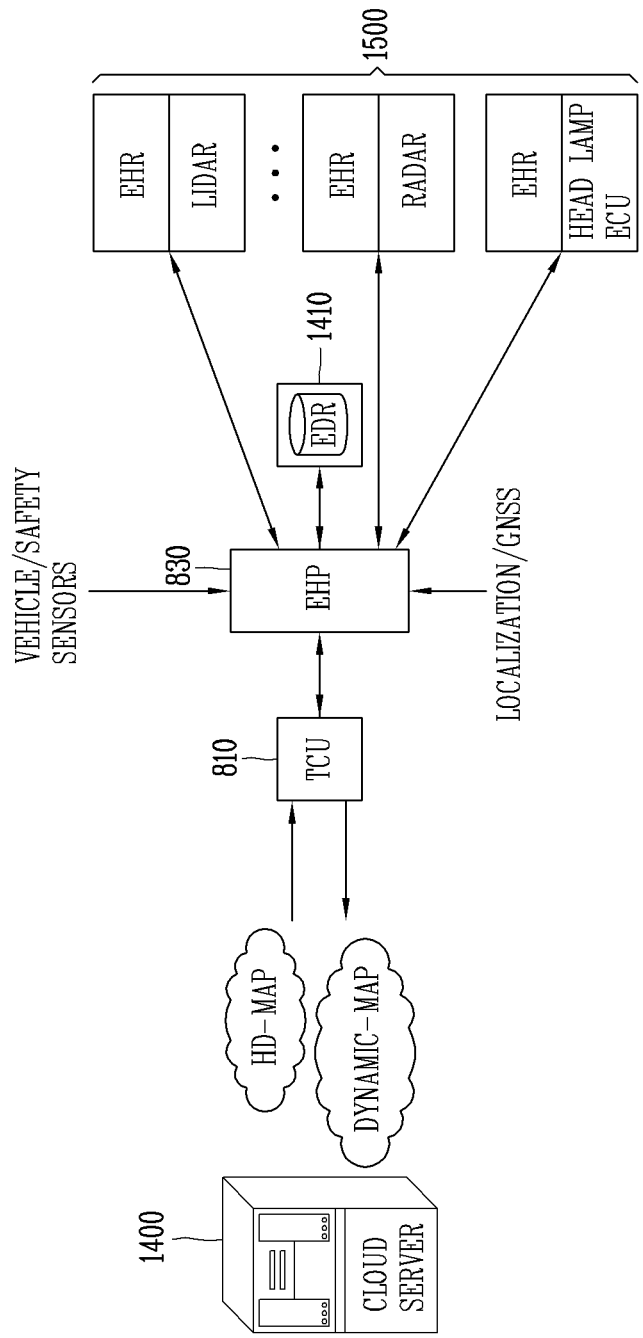

In some implementations, as illustrated in FIG. 15D, the communication unit 810 and the EDR 1410 may not be provided in the path providing device 800 but may be independently provided in the vehicle 100.

In this case, the path providing device 800 may not include the communication unit 810 and the EDR 1410, but may include the processor 830 (EHP).

When the communication unit 810 and the EDR 1410 are not included in the path providing device 800, the path providing device 800 may be connected in a wired manner to the communication unit 810 and the EDR 1410, respectively, to perform wired communication (e.g., CAN communication).

For example, the path providing device 800 may be connected in the wired manner to the communication unit 810 and the EDR 1410, respectively, through the interface unit 820.

Figure 15E:
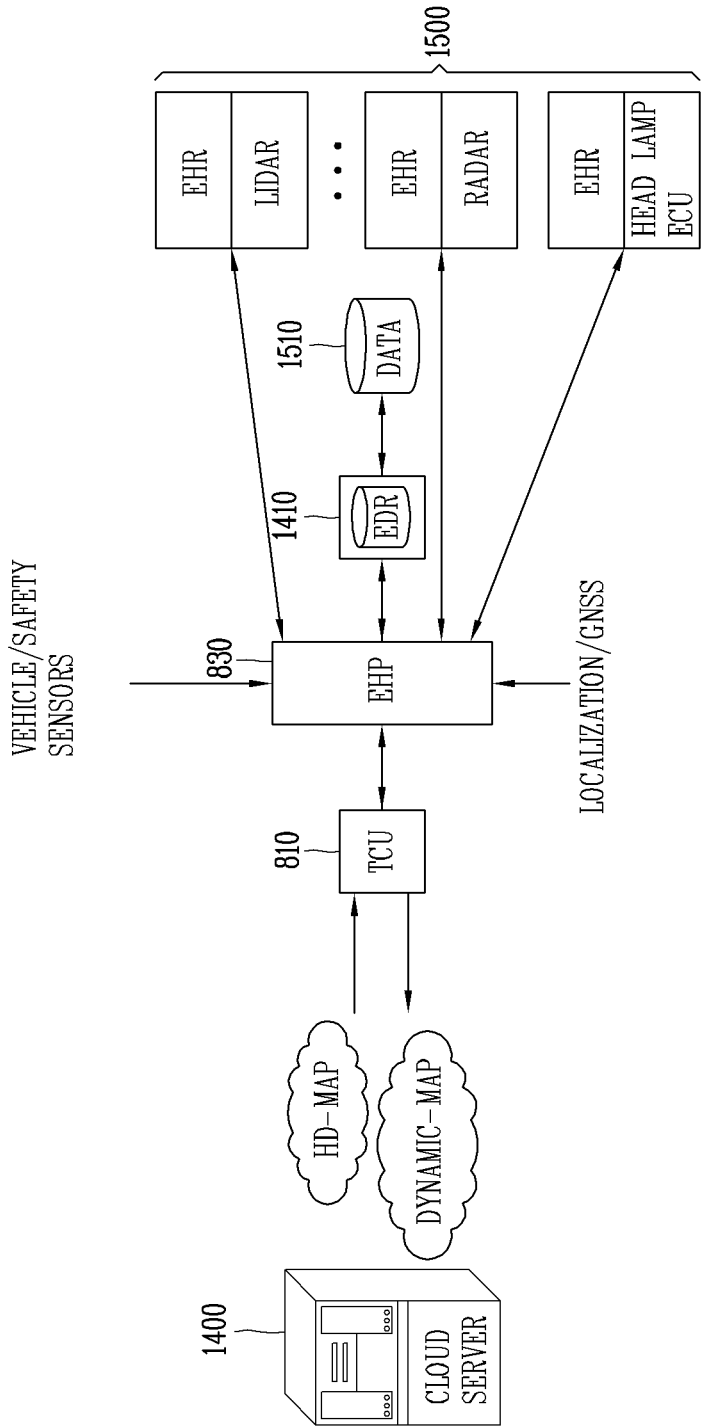

In some implementations, as illustrated in FIG. 15E, the processor 830 may transmit vehicle status information to the EDR 1410 through wired communication.

Thereafter, the EDR 1410 may encrypt the received vehicle status information and transmit the encrypted vehicle status information for storage to a storage part 1510 provided in the vehicle through wired communication.

The storage part 1510 provided in the vehicle may be the memory 140 described above. In addition, the storage part 1510 provided in the vehicle may be replaced with the storage part 832 of the processor 830 provided in the path providing device 800 described in FIG. 8.

The EDR 1410 may transmit the encrypted information stored in the storage part 1510 provided in the vehicle to the communication unit 810 through wired communication.

Also, the encrypted information transmitted to the communication unit 810 may be transmitted to the server 1400 through wireless communication.

Here, the server 1400 may be the external server described above.

Such operation may be performed by the control of the processor 830, for example. By way of further example, the EDR 1410 may transmit the encrypted information stored in the storage part 1510 to the communication unit 810 when a preset condition is satisfied. For example, the EDR 1410 may transmit the encrypted information stored in the storage part 1510 to the communication unit 810, in response to an occurrence of a specific event (e.g., when an impact with a predetermined level or stronger has been applied to the vehicle, when an accident of another vehicle has been detected, etc.).

At this time, the communication unit 810 may form a communication channel used to transmit the encrypted information received from the EDR 1410 to the server 1400, and transmit the encrypted information to the server 1400 through the communication channel.

The communication channel may be determined based on the number of USIM chips mounted in the communication unit 810, and may be formed as many as the number of USIM chips.

The processor 830 may perform communication with the server 1400 through the communication channel, and set a different channel to perform communication with the server 1400 based on at least one of speed of the communication channel, the number of communication channels, an amount of data to be transmitted, or a type of data.

Figure 15F:
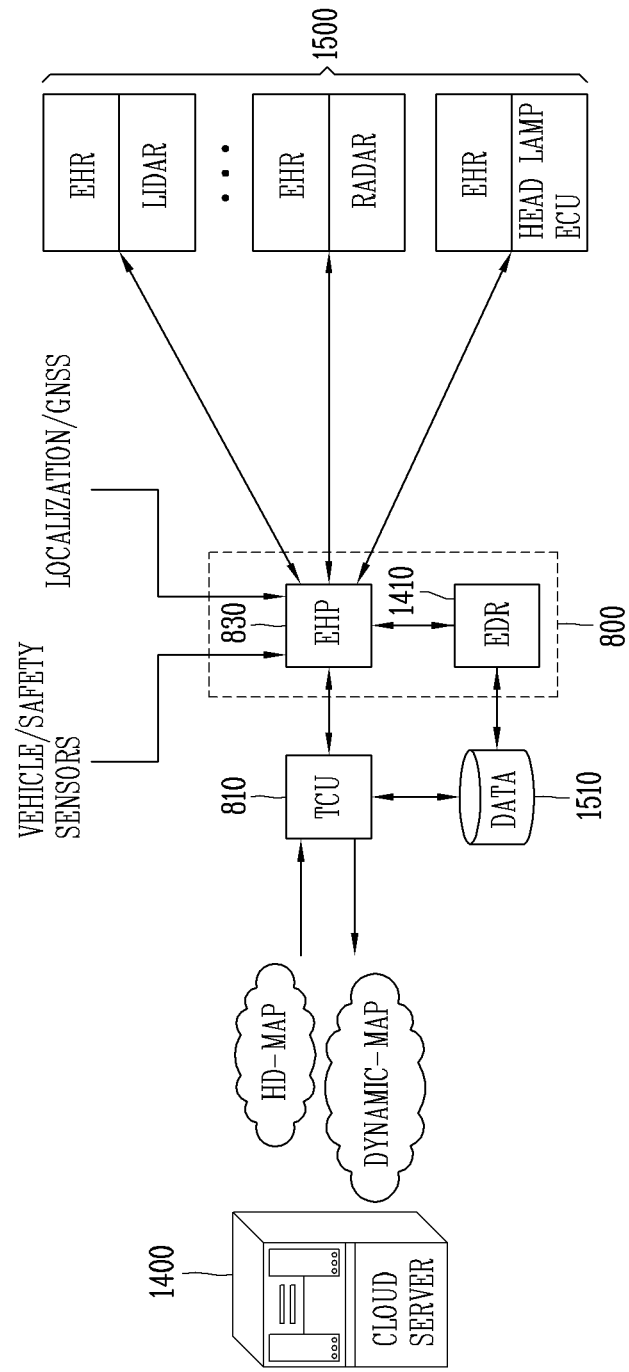

In some implementations, referring to FIG. 15F, in the path providing device 800, the processor 830 and the EDR 1410 may be provided on one printed circuit board, and the communication unit 810 may be independently provided in the vehicle 100.

The communication unit 810 may perform wired communication (CAN communication) with the processor 830.

The processor 830 and the EDR 1410 may directly transmit and receive data through circuits provided on the printed circuit board.

The EDR 1410 and the storage part 1510 provided in the vehicle may perform wired communication (CAN communication), and the storage part 1510 provided in the vehicle may perform wired or wireless communication with the communication unit 810.

The processor 830 may transmit (broadcast) an ADASIS message (e.g., autonomous driving visibility information, an optimal path, HD map information, dynamic information, etc.) to the electric components 1500 provided in the vehicle. At this time, the processor 830 may transmit the ADASIS Message to the electric components 1500 provided in the vehicle through the interface unit 820 in the wired communication manner, or through the communication unit 810 in the wireless communication manner.

In addition, the EDR 1410 may encrypt the generated/stored vehicle status information and transmit the encrypted vehicle status information to the storage part 1510 provided in the vehicle for storage.

Figure 15G:
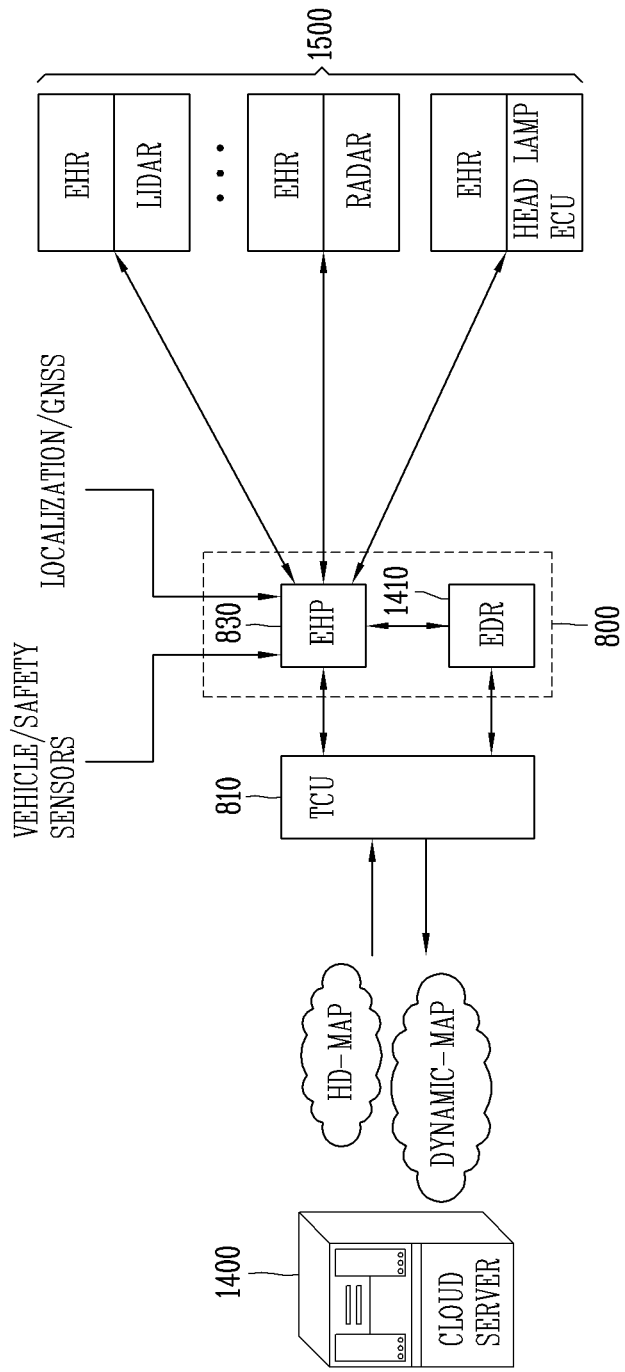

In some implementations, referring to FIG. 15G, in the path providing device 800, the processor 830 and the EDR 1410 may be provided on one printed circuit board, and the communication unit 810 may not be provided in the path providing device 800 but independently provided in the vehicle.

The processor 830 may control the EDR 1410 so that the EDR 1410 encrypts the vehicle status information and transmits the encrypted information to the communication unit 810 through wired communication, and also control the communication unit 810 to transmit the encrypted vehicle status information to the server 1400.

As such, the processor 830, the EDR 1410, and the communication unit 810 that can be provided in the path providing device 800 may be configured in various forms.

Hereinafter, with reference to the accompanying drawings, it will be described in more detail with respect to various implementations in which the path providing device includes the EDR or performs communication with the EDR.

Figure 16:
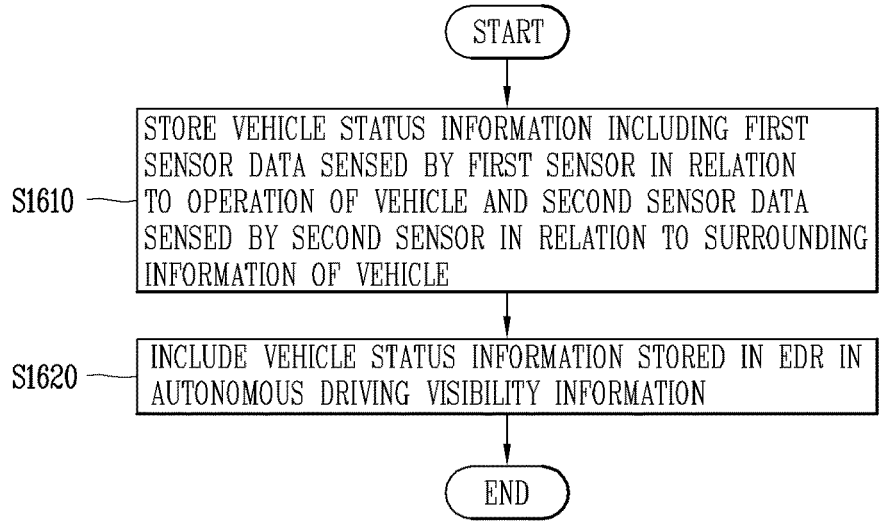
FIGS. 16, 17A, 18, 19, and 20 are flowcharts illustrating various methods of controlling a path providing device.
Figure 17A:
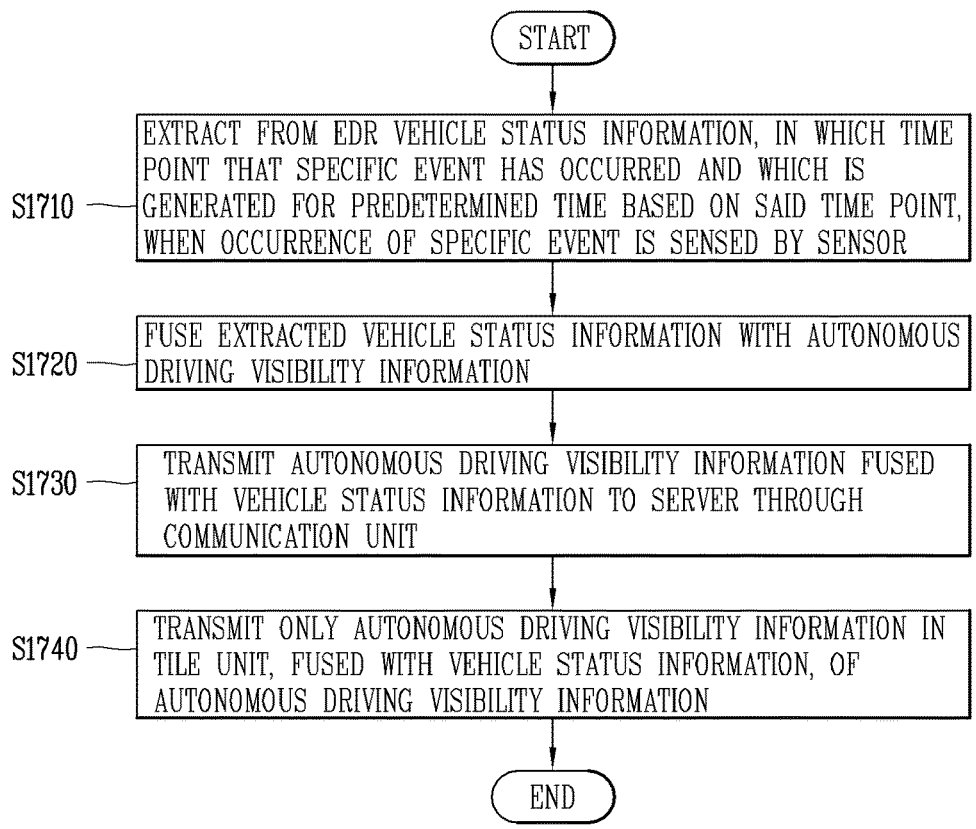
Figure 17B:
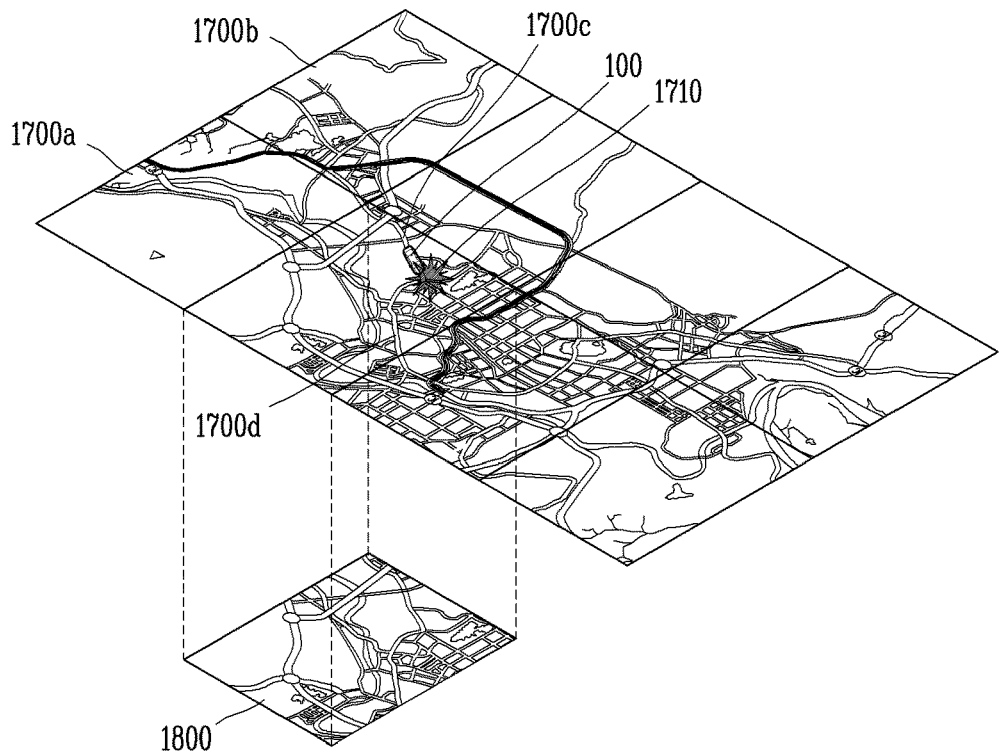
FIG. 17B is a conceptual view illustrating the control method illustrated in FIG. 17A.

FIGS. 16, 17A, 18, 19, and 20 are flowcharts illustrating various methods of controlling a path providing device, and FIG. 17B is a conceptual view illustrating the control method illustrated in FIG. 17A.

The contents described below are all applicable to the contents described with respect to FIGS. 15A to 15G.

As described above, the path providing device 800 may include the EDR 1410.

Referring to FIG. 16, the EDR 1410 may store vehicle status information that includes first sensor data sensed by the first sensor in relation to the operation of the vehicle, and second sensor data sensed by the second sensor in relation to surrounding information of the vehicle (S1610).

The processor 830 may include the vehicle status information that is stored in the EDR 1410 in autonomous driving visibility information (S1620).

Here, the autonomous driving visibility information may indicate electronic horizontal information (or eHorizon data) described above. The autonomous driving visibility information (eHorizon information) is information (data, or environment) which the vehicle 100 uses for performing autonomous driving in lane units, namely, as illustrated in FIG. 10, may refer to autonomous driving environment data in which every information (map information, vehicles, objects, moving objects, environment, weather, etc.) within a predetermined range based on a road including an optimal path in which the vehicle 100 is to move or based on the optimal path is fused together. The autonomous driving environment data may refer to data (or overall data environment) that the processor 830 of the vehicle 100 uses to autonomously drive the vehicle 100 or calculate an optimal path of the vehicle 100.

In the autonomous driving visibility information, sensing information may be fused with an optimal path, and dynamic information that guides a movable object located on the optimal path may also be fused with the optimal path.

As described above, since the autonomous driving visibility information that indicates the autonomous driving environment data is based on a high-definition map (HD-map), it may be provided with a plurality of layers of data as illustrated in FIGS. 11A and 11B.

The path providing device 800 may generate and store vehicle status information that includes first sensor data sensed by the first sensor (vehicle sensor) in relation to the operation of the vehicle, and second sensor data sensed by the second sensor (safety sensor) in relation to surrounding information of the vehicle.

The vehicle status information may be generated based on the first sensor data and the second sensor data. The vehicle status information may be generated and stored in the EDR 1410. However, the present disclosure is not limited thereto, and the vehicle status information may alternatively be generated by the processor 830 and stored in the EDR 1410.

At this time, the processor 830 may include the vehicle status information that has been stored in the EDR in the autonomous driving visibility information.

Specifically, the processor 830 may process the vehicle status information stored in the EDR in a layer form and fuse it with the autonomous driving visibility information.

As described above, the autonomous driving visibility information may have the plurality of layers. Accordingly, in order to include (fuse) the vehicle status information stored in the EDR 1410 in (with) the autonomous driving visibility information, the processor 830 may process the vehicle status information into a form of layers to be fused with the autonomous driving visibility information, and then fuse the processed vehicle status information with the autonomous driving visibility information.

In addition, the processor 830 may fuse the vehicle status information stored in the EDR with the autonomous driving visibility information based on a position of the vehicle and time.

The vehicle status information may include information related to a predetermined area based on a path along which the vehicle 100 has traveled or a current position of the vehicle 100.

Since the vehicle status information includes not only information related to the operation of the vehicle but also surrounding information related to the vehicle, the vehicle status information is not limited to the path on which the vehicle has traveled, but may include information related to a predetermined area that has a predetermined width (corresponding to a distance to a surrounding area) based on the path along which the vehicle has traveled or set based on the current position of the vehicle.

Accordingly, the processor 830 may fuse the vehicle status information stored in the EDR 1410 with the autonomous driving visibility information based on the position of the vehicle and time.

For example, as illustrated in FIG. 17B, the vehicle status information may be configured to correspond to autonomous driving visibility information in tile units. In addition, the vehicle status information 1800 may be fused with one tile of autonomous driving visibility information (or one autonomous driving visibility information tile) 1700c based on the position of the vehicle and time, among a plurality of tiles of autonomous driving visibility information (or a plurality of autonomous driving visibility information tiles) 1700a, 1700b, 1700c, and 1700d.

The one autonomous driving visibility information tile 1700c may be autonomous driving visibility information in a tile unit including a place where the vehicle 100 is currently located.

As described above, the processor 830 can fuse the vehicle status information with the autonomous driving visibility information, and as illustrated in FIG. 17B, can fuse such information in a manner of adding a new layer to the plurality of layers constructing the autonomous driving visibility information.

Referring to FIG. 17A, when a specific event occurs (is detected) through a sensor, the processor 830 may extract vehicle status information, in which a time point at which the specific event has occurred is included and which is generated for a predetermined time based on the time point, from the EDR (S1710).

The processor 830 may fuse the extracted vehicle status information with autonomous driving visibility information (S1720).

The processor 830 may transmit the autonomous driving visibility information fused with the vehicle status information to the server through the communication unit 810 (S1730).

At this time, the processor 830 may transmit, to the server 1400, only an autonomous driving visibility information tile fused with the vehicle status information, of the whole autonomous driving visibility information (S1740).

As illustrated in FIG. 17B, the processor 830 may detect a specific event occurred in the vehicle or a specific event occurred within a predetermined distance from the vehicle, through at least one of the first and second sensors.

For example, the processor 830 may determine (or detect) that a specific event has occurred when an impact with a predetermined level or higher is sensed by a sensor, when noise generated in a predetermined distance from the vehicle 100 is a specific decibel or higher, or such noise corresponds to a noise pattern generated upon an occurrence of an accident.

The specific event may include at least one of a collision of the vehicle, a theft of the vehicle, or a collision with another vehicle occurred within a predetermined distance from the vehicle.

The processor 830 may determine that the vehicle has been stolen, for example, when the vehicle is moved in a state that a vehicle key is not detected in the vehicle or within a predetermined distance from the vehicle, or when an engine of the vehicle is started.

When it is determined that such a specific event 1710 has occurred, the processor 830 may fuse (include) vehicle status information 1800 with (in) a tile including a place where the specific event 1710 has occurred (i.e., the autonomous driving visibility information tile) 1700c.

Thereafter, the processor 830 may transmit only the autonomous driving visibility information tile 1700c, which has been fused with the vehicle status information, to the communication unit 810, among the plurality of autonomous driving visibility information tiles.

When vehicle status information is fused with a plurality of autonomous driving visibility information tiles, the processor 830 may transmit the plurality of autonomous driving visibility information tiles fused with the vehicle status information to the server 1400.

For example, as the specific event 1710 has occurred in a boundary between the plurality of (autonomous driving visibility information) tiles 1700c and 1700d or occurred in a specific tile 1700d, when the processor 830 generates vehicle status information, in which a time point when the specific event has occurred is included and which is generated for a predetermined time based on the time point, the vehicle status information may be fused (included) even with (in) another tile 1700c as well as the specific tile 1700d.

For example, the plurality of tiles may be determined based on a path along which the vehicle 100 has traveled, and type and number of the plurality of tiles may be determined according to a point at which a specific event has occurred, a time point when the specific event has occurred, and a time interval for a predetermined time from the time point.

The vehicle status information may be fused with each of the determined plurality of (autonomous driving visibility information) tiles by being processed in a form of layer.

When there is the plurality of information tiles fused with the vehicle status information, the processor 830 may transmit the plurality of tiles (autonomous driving visibility information) fused with the vehicle status information to the server through the communication unit 810.

Upon receiving the autonomous driving visibility information fused with the vehicle status information from the vehicle 100, the server 1400 may update HD map and dynamic information by specifying the time point and the place at which the specific event has occurred.

Thereafter, the server 1400 may transmit the updated information when transmitting the HD map and the dynamic information to the vehicle 100 or another vehicle. Accordingly, the present disclosure can provide a system capable of immediately reflecting events (accidents, theft, etc.) occurred on roads in real time in autonomous driving visibility information.

In some implementations, the processor 830 may delete vehicle status information fused with autonomous driving visibility information when the vehicle 100 transmits the autonomous driving visibility information fused with the vehicle status information to the server 1400 or when the vehicle 100 is moved a predetermined distance out of an area where a specific event has occurred.

For example, when vehicle status information is transmitted to the server by being fused with autonomous driving visibility information or the vehicle is moved a predetermined distance out of an area where a specific event has occurred, the vehicle status information is not necessary any more. Therefore, the vehicle status information is deleted to reduce capacity of the autonomous driving visibility information.

In addition, the processor 830 may store vehicle status information in the EDR in association with an optimal path.

When fusing (including) vehicle status information with (in) autonomous driving visibility information, the processor 830 may associate (link) an optimal path included in the autonomous driving visibility information with the vehicle status information for storage.

Accordingly, the vehicle status information may indicate vehicle status information on the optimal path defined in lane units. Accordingly, the processor 830 may not include vehicle status information related to unnecessary lanes, in which the vehicle does not travel, in autonomous driving visibility information.

On the other hand, the EDR 1410 may determine vehicle status information for a predetermined time just before a time point that a specific event occurs, using first sensor data sensed by the first sensor (vehicle sensor) in relation to the operation of the vehicle and second sensor data sensed by the second sensor (safety sensor) in relation to surrounding information on the vehicle.

Specifically, the EDR 1410 may receive information in which the first sensor data and the second sensor data are processed by the processor 830, and determine a vehicle driving state using the received information.

In order to determine (generate, store) vehicle status information, the EDR 1410 may receive the first sensor data related to the operation of the vehicle and the second sensor data related to the surrounding information of the vehicle from the processor 830. At this time, the processor 830 may transmit the first sensor data and the second sensor data to the EDR 1410 as they are or by processing those data to include only information required for generating the vehicle status information in the EDR 1410.

Figure 18:
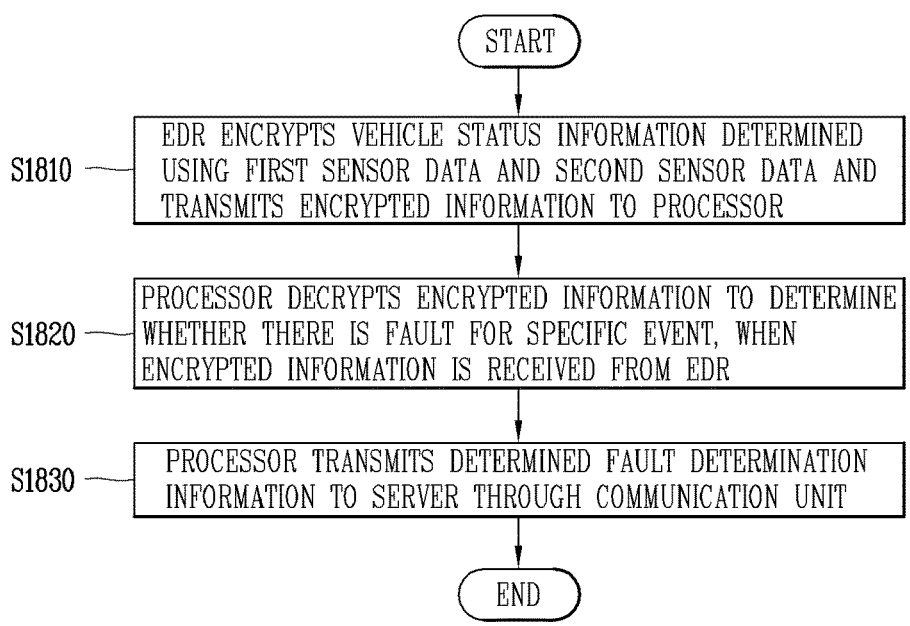

Referring to FIG. 18, the EDR 1410 may encrypt the first sensor data and the second sensor data, and transmit the encrypted data to the server 1400 through the communication unit 810.

The EDR 1410 may encrypt vehicle status information determined using the first sensor data and the second sensor data, and may transmit the encrypted information to the processor 830 (S1810).

The EDR 1410 may encrypt the vehicle status information so as not to be exposed to other vehicles or non-authenticated other users, and transmit the encrypted vehicle status information to the processor 830.

When the encrypted information is received from the EDR 1410, the processor 830 may decrypt the received encrypted information and determine presence or non-presence of a fault (or whether the vehicle is at fault) for a specific event (S1820).

The processor 830 may be configured to decrypt the encrypted vehicle status information. The processor 830 may determine presence or non-presence of fault for a specific event after decrypting the encrypted vehicle status information.

Subsequently, the processor 830 may transmit fault determination information related to the presence or non-presence of the fault to the server 1400 through the communication unit 810 (S1830).

Specifically, the processor 830 may determine whether there is a fault for a specific event, based on the generated vehicle status information and autonomous driving visibility information.

A detailed method of determining presence or non-presence of fault for a specific event will be described in more detail with respect to FIG. 20.

Figure 19:
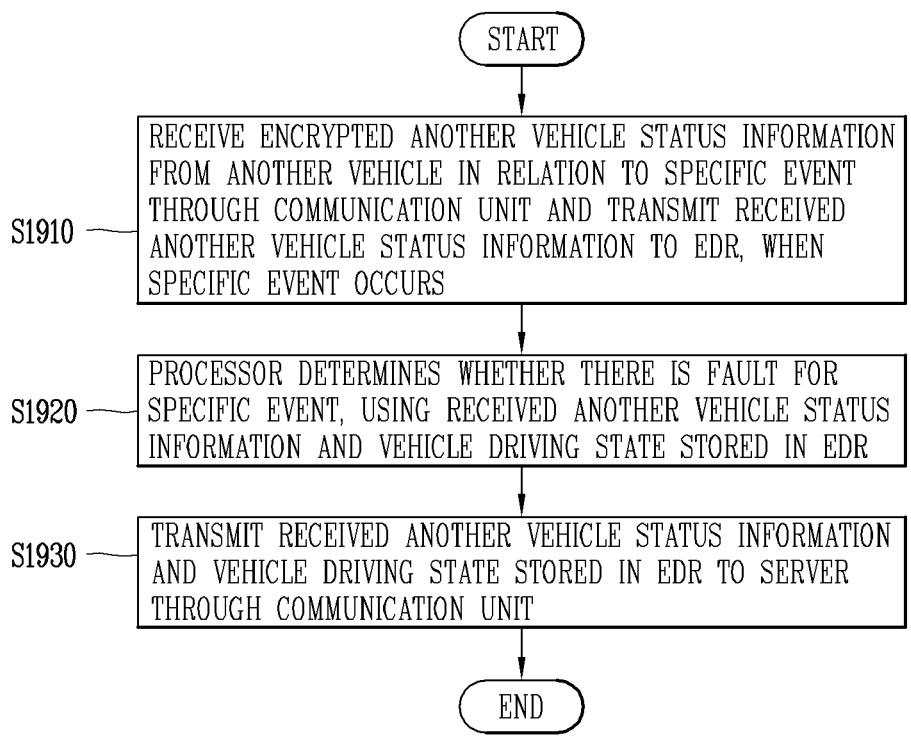

In some implementations, referring to FIG. 19, when a specific event occurs, the processor 830 may receive encrypted another vehicle status information from the another vehicle related to the specific event through the communication unit 810.

In addition, the processor 830 may transmit the received another vehicle status information to the EDR 1410 (S1910).

In order to determine whether or not there is a fault for a specific event, the processor 830 may request another vehicle associated with the specific event (e.g., another vehicle causing a collision with the vehicle 100) to transmit vehicle status information generated in the another vehicle (i.e., another vehicle status information or status information related to the another vehicle), and receive the requested another vehicle status information.

The processor 830 may determine presence or non-presence of fault for the specific event based on the received another vehicle status information (a driving state of the another vehicle), and the vehicle status information stored in the EDR (or a driving state of the vehicle 100) (S1920).

Thereafter, the processor 830 may transmit the received another vehicle status information (or the driving state of the another vehicle) and the driving state of the vehicle 100 (vehicle status information) stored in the EDR to the server 1400 through the communication unit 810.

This may serve as a factor to be considered when updating autonomous driving visibility information related to a point (spot) where the specific event (accident) has occurred or generating an optimal path later.

Hereinafter, a method in which the processor 830 determines presence or non-presence of fault for a specific event will be described in more detail.

Figure 20:
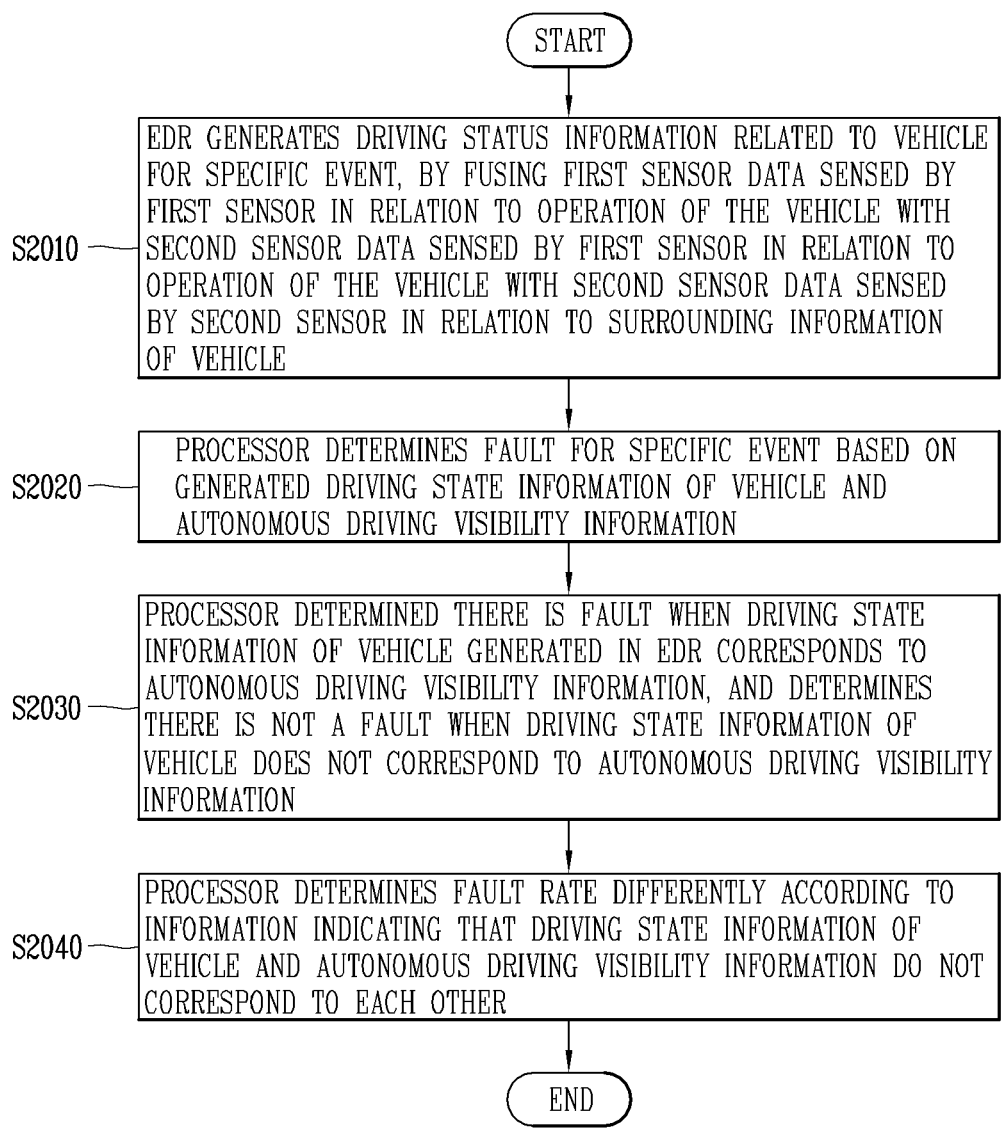

Referring to FIG. 20, as described above, the EDR may generate (and store) vehicle status information with respect to a specific event, by fusing first sensor data sensed by a first sensor in relation to the operation of the vehicle and second sensor data sensed by a second sensor in relation to surrounding information on the vehicle (S2010).

The processor 830 may determine presence or non-presence of the fault for the specific event, based on the generated vehicle status information and autonomous driving visibility information (S2020).

For example, the vehicle status information may refer to driving status information related to the vehicle, including all of a driving state, a driving path, speed, a steering angle, a heading direction, lanes, and the like.

Determining presence or non-presence of fault may also include determining a fault ratio as well as determining which subject is more at fault.

In the autonomous driving visibility information, an optimal path along which the vehicle should travel is determined in lane units, and the processor 830 may control the vehicle to autonomously travel or perform a path guidance for the vehicle based on the autonomous driving visibility information.

At this time, when a specific event occurs, the processor 830 may determine which subject is more at fault based on the vehicle status information and the autonomous driving visibility information.

Specifically, the processor 830 may determine non-presence of fault when the vehicle status information (i.e., the driving state information on the vehicle) generated in the EDR 1410 corresponds to the autonomous driving visibility information (S2030).

Further, the processor 830 may determine that there is a fault when the vehicle status information does not correspond to the autonomous driving visibility information (S2040). Here, a reference for determining whether there is a fault is the vehicle 100.

For example, when an optimal path included in autonomous driving visibility information matches vehicle status information (for example, a path along which the vehicle has traveled), it indicates that the vehicle 100 has traveled according to the autonomous driving visibility information. Therefore, the processor 830 may determine that the vehicle is not at fault for a specific event (accident).

As another example, when an optimal path included in autonomous driving visibility information is different from vehicle status information (e.g., a path along which the vehicle has traveled or whether a driver has pushed an acceleration pedal at a time point when he/she has to step on a brake pedal), it indicates that the vehicle 100 has not traveled according to the autonomous driving visibility information. Therefore, the processor 830 may determine that the vehicle 100 is at fault for the specific event (accident).

At this time, the processor 830 may determine a fault rate (that is, the fault of the vehicle) differently according to a degree to which the vehicle status information corresponds to the autonomous driving visibility information.

For example, the processor 830 may determine that the vehicle 100 is more at fault for a specific event when a position of the vehicle recognized based vehicle status information is farther from an optimal path included in autonomous driving visibility information.

As described above, the present disclosure can provide a new path providing device, which is capable of determining even whether the vehicle is at fault as well as vehicle status information in the case where a specific event has occurred, based on autonomous driving visibility information including an optimal path in lane units and vehicle status information indicating a driving state of the vehicle.

Figure 21A:
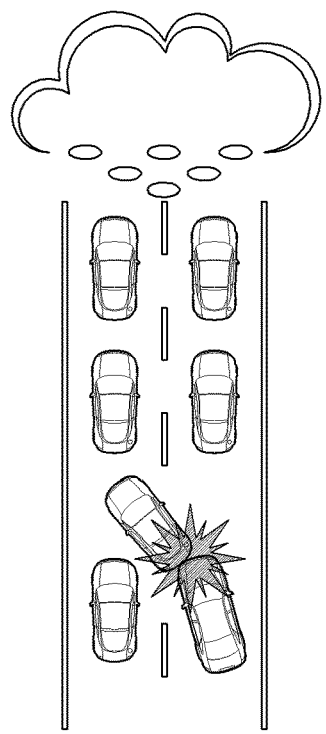
FIGS. 21A and 21B are conceptual views illustrating one example for determining whether there is a fault or not.
Figure 21B:
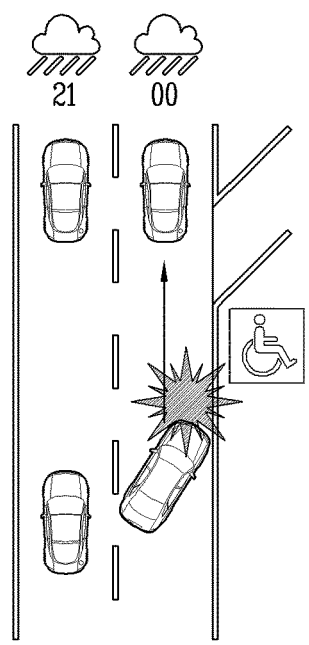

FIGS. 21A and 21B are conceptual views illustrating an example for determining whether there is a fault or not.

Referring to FIG. 21A, the processor 830 may receive first sensor data related to the operation of the vehicle from a first sensor. At this time, the first sensor data may include sensor data indicating that a brake of the vehicle has been stepped on and data indicating that a collision has occurred with a preceding vehicle.

Further, the processor 830 may receive second sensor data related to surrounding information of the vehicle from a second sensor. At this time, the second sensor data may include sensor data indicating that the weather is snowing and a lane in which the vehicle 100 is located is covered with snow.

The processor 830 may transmit the first sensor data and the second sensor data to the EDR 1410.

The EDR 1410 may generate and store vehicle status information indicating that a brake pedal has been slammed on but a collision with a preceding vehicle has occurred in a second lane, in which the vehicle 100 is located, in a situation that it is snowing.

At this time, the processor 830 may determine whether the vehicle 100 is at fault and a fault rate based on generated autonomous driving visibility information and the vehicle status information.

For example, when the autonomous driving visibility information and the vehicle status information correspond to each other (for example, when another vehicle has made a sudden stop or has suddenly changed a lane), the processor 830 may determine that the vehicle is not at fault for the event.

A similar implementation may be included in a case illustrated in FIG. 21B.

The processor 830 may receive first sensor data related to the operation of the vehicle from a first sensor. At this time, the first sensor data may include steering angle information related to the vehicle.

Further, the processor 830 may receive second sensor data related to surrounding information of the vehicle from a second sensor. At this time, the second sensor data may include sensor data indicating that it is snowing and the vehicle is traveling on the last lane.

The processor 830 may transmit the first sensor data and the second sensor data to the EDR 1410.

The EDR 1410 may generate and store vehicle status information indicating that the vehicle traveling in the last lane has been steered to the right while it is raining, based on the first and second sensor data.

At this time, the processor 830 may determine whether the vehicle 100 is at fault and a fault rate based on generated autonomous driving visibility information and the vehicle status information.

For example, when the autonomous driving visibility information and the vehicle status information do not correspond to each other (e.g., when the vehicle status information indicates the change of a steering angle to the right although the autonomous driving visibility information includes information related to a straight travel), the processor 830 may determine that the vehicle is at fault for the event.

Hereinafter, effects of a path providing device and a path providing method thereof according to the present disclosure will be described.

First, the present disclosure can provide a path providing device that is optimized for generating or updating autonomous driving visibility information.

Second, the present disclosure can provide a new path providing device capable of linking (associating) vehicle status information with autonomous driving visibility information by including an event data recorder (EDR).

Third, the present disclosure can provide a path providing device, capable of determining presence or non-presence of fault for an accident, based on vehicle status information determined in an EDR and autonomous driving visibility information generated in the path providing device, and a method of controlling the same.

The present disclosure can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described implementations are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A path providing device configured to provide a path information to a vehicle, the device comprising:
    a communicator configured to receive, from a server, map information including a plurality of layers of data;
    an interface configured to receive sensing information from one or more sensors disposed at the vehicle, the sensing information including an image received from an image sensor;
    a processor configured to:
        identify a lane in which the vehicle is located among a plurality of lanes of a road based on the sensing information,
        determine an optimal path for guiding the vehicle from the identified lane, the optimal path comprising one or more lanes included in the map information,
        generate autonomous driving visibility information and transmit the generated autonomous driving visibility information to at least one of the server or an electric component disposed at the vehicle based on the sensing information and the determined optimal path, and
        update the optimal path based on dynamic information related to a movable object located on the optimal path and the autonomous driving visibility information; and
    an event data recorder (EDR) configured to store vehicle status information including first sensor data sensed by a first sensor associated with an operation of the vehicle, and second sensor data sensed by a second sensor associated with surrounding information of the vehicle,
    wherein the processor is configured to include the vehicle status information stored in the EDR in the autonomous driving visibility information,
    wherein the processor is configured to:
        process the stored vehicle status information into a form of layer,
        fuse the processed vehicle status information with the autonomous driving visibility information based on a location of the vehicle and time, and
        transmit the autonomous driving visibility information fused with the vehicle status information to the server through the communicator.

2. The device of claim 1, wherein the processor is configured to:
    based on a sensor among the one or more sensors sensing an occurrence of a specific event, extract the vehicle status information associated with the specific event from the stored vehicle status information, in which a time point associated with the occurrence of the specific event is included and is generated for a predetermined time based on the time point, and
    fuse the extracted vehicle status information with the autonomous driving visibility information.

3. The device of claim 2, wherein the processor is configured to transmit the autonomous driving visibility information fused with the vehicle status information to the server through the communicator.

4. The device of claim 3, wherein the processor is configured to transmit, to the server, a portion of the autonomous driving visibility information in a tile unit, fused with the vehicle status information.

5. The device of claim 4, wherein the processor is configured to transmit, based on the vehicle status information being fused with a plurality of the portions of the autonomous driving visibility information, the plurality of the portions of the autonomous driving visibility information fused with the vehicle status information, to the server.

6. The device of claim 2, wherein the processor is configured to delete, based on the vehicle transmitted the autonomous driving visibility information fused with the vehicle status information to the server or the vehicle being out of an area where the specific event has occurred by a predetermined distance or more, the vehicle status information fused with the autonomous driving visibility information.

7. The device of claim 2, wherein the specific event includes at least one of a collision of the vehicle, a theft of the vehicle, or a collision of another vehicle occurred within a predetermined distance from the vehicle.

8. The device of claim 1, wherein the processor is configured to store the vehicle status information in the EDR by associating the vehicle status information with the optimal path.

9. The device of claim 1, wherein the EDR is configured to determine the vehicle status information for a predetermined time before a time point associated with an occurrence of a specific event, based on the first sensor data and the second sensor data.

10. The device of claim 9, wherein the EDR is configured to:
   receive, from the processor, information obtained by processing the first sensor data and the second sensor data, and
   determine a driving state of the vehicle based on the received information.

11. The device of claim 1, wherein the EDR is configured to:
   encrypt the first sensor data and the second sensor data, and
   transmit the encrypted data to the server through the communicator.

12. The device of claim 1, wherein the EDR is configured to:
   encrypt the vehicle status information determined by using the first sensor data and the second sensor data, and
   transmit the encrypted vehicle status information to the processor.

13. The device of claim 12, wherein the processor is configured to:
   decrypt the encrypted information, and
   determine whether there is a fault for a specific event based on the encrypted information being received from the EDR.

14. The device of claim 13, wherein the processor is configured to transmit information related to the fault determination to the server through the communicator.

15. A path providing method, performed by a path providing device configured to provide path information to a vehicle, the method comprising:
   receiving, from a server, map information including a plurality of layers of data;
   receiving, from one or more sensors disposed at the vehicle, sensing information including an image received from an image sensor;
   identifying a lane in which the vehicle is located among a plurality of lanes of a road based on the sensing information;
   determining an optimal path for guiding the vehicle from the identified lane, the optimal path comprising one or more lanes included in the map information;
   generating autonomous driving visibility information and transmitting the generated autonomous driving visibility information to at least one of the server or an electric component disposed at the vehicle based on the sensing information and the determined optimal path;
   updating the optimal path based on dynamic information related to a movable object located in the optimal path and the autonomous driving visibility information;
   storing vehicle status information including first sensor data sensed by a first sensor associated with an operation of the vehicle, and second sensor data sensed by a second sensor associated with surrounding information of the vehicle;
   including the stored vehicle status information in the autonomous driving visibility information;
   processing the stored vehicle status information into a form of layer;
   fusing the processed vehicle status information with the autonomous driving visibility information based on a location of the vehicle and time; and
   transmitting the autonomous driving visibility information fused with the vehicle status information to the server.

16. The method of claim 15, further comprising:
   based on sensing an occurrence of a specific event, extracting the vehicle status information associated with the specific event from the stored vehicle status information, in which a time point associated with the occurrence of the specific event is included and is generated for a predetermined time based on the time point; and
   fusing the extracted vehicle status information with the autonomous driving visibility information.

* * * * *